(12) United States Patent
Tan et al.

(10) Patent No.: US 9,007,984 B1
(45) Date of Patent: Apr. 14, 2015

(54) NETWORK CODING FOR SATELLITE COMMUNICATIONS

(71) Applicant: The Aerospace Corporation, El Segundo, CA (US)

(72) Inventors: Harry H Tan, Palos Verdes Estates, CA (US); Robert M Liang, Irvine, CA (US); Joseph Han, Irvine, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 14/084,301

(22) Filed: Nov. 19, 2013

(51) Int. Cl.
*H04B 7/185* (2006.01)

(52) U.S. Cl.
CPC ........ *H04B 7/18526* (2013.01); *H04B 7/18515* (2013.01); *H04B 7/18582* (2013.01)

(58) Field of Classification Search
CPC ........... H04B 7/18526; H04B 7/18515; H04B 7/18582; H04L 1/004
USPC ................................................. 370/312, 432
See application file for complete search history.

(56) References Cited

U.S. PATENT DOCUMENTS

| | | | |
|---|---|---|---|
| 4,742,512 A | 5/1988 | Akashi et al. | |
| 6,108,317 A | 8/2000 | Jones et al. | |
| 6,160,797 A | 12/2000 | Robert, III et al. | |
| 6,202,189 B1 | 3/2001 | Hinedi et al. | |
| 6,411,607 B1 | 6/2002 | Robert, III et al. | |
| 7,840,178 B2 | 11/2010 | Hellman | |
| 8,081,641 B2 | 12/2011 | Katabi et al. | |
| 8,149,752 B2* | 4/2012 | Li et al. | 370/312 |
| 8,243,601 B2* | 8/2012 | Li et al. | 370/235 |
| 8,265,548 B2 | 9/2012 | Sun et al. | |
| 8,401,462 B2 | 3/2013 | Hellman | |
| 8,401,465 B2 | 3/2013 | Sun et al. | |
| 8,503,346 B2* | 8/2013 | Hwang | 370/312 |
| 8,559,311 B2* | 10/2013 | Hwang | 370/235 |
| 2006/0023717 A1 | 2/2006 | Trachtman et al. | |
| 2007/0014536 A1 | 1/2007 | Hellman | |
| 2008/0075080 A1 | 3/2008 | Katabi et al. | |
| 2009/0073914 A1* | 3/2009 | Sun et al. | 370/315 |
| 2009/0181615 A1* | 7/2009 | So et al. | 455/7 |
| 2009/0285155 A1 | 11/2009 | Scarpa et al. | |
| 2010/0112938 A1 | 5/2010 | Sun et al. | |
| 2010/0255772 A1 | 10/2010 | Hellman | |
| 2011/0134828 A1* | 6/2011 | Osseiran et al. | 370/315 |
| 2011/0142013 A1* | 6/2011 | Manssour et al. | 370/336 |

(Continued)

FOREIGN PATENT DOCUMENTS

| | | |
|---|---|---|
| EP | 2264929 A | 12/2010 |
| WO | 2012125943 A | 9/2012 |

OTHER PUBLICATIONS

Katti et al., "XORs in the Air: Practical Wireless Network Coding," Proc. of SIG-COMM 2006, Sep. 2006.*

(Continued)

*Primary Examiner* — Paul H Masur
(74) *Attorney, Agent, or Firm* — Leonard Patel LLP

(57) ABSTRACT

A physical layer network coding architecture is provided to increase downlink capacity for satellite network architectures. For instance, a network coding controller may perform a XOR network coding operation on FEC encoded information received from a first terminal and second terminal, and broadcast a single downlink message containing the XOR network coded information to the first and second terminal.

19 Claims, 23 Drawing Sheets

(56) References Cited

U.S. PATENT DOCUMENTS

| | | | |
|---|---|---|---|
| 2011/0164621 A1* | 7/2011 | Lee et al. | 370/400 |
| 2012/0039231 A1 | 2/2012 | Suri et al. | |
| 2012/0140796 A1 | 6/2012 | Dai et al. | |
| 2012/0182862 A1 | 7/2012 | Cirkovic | |
| 2012/0300692 A1 | 11/2012 | Sfar et al. | |
| 2013/0016606 A1 | 1/2013 | Cirkovic et al. | |
| 2013/0051309 A1 | 2/2013 | Van Phan et al. | |
| 2013/0163552 A1* | 6/2013 | Manssour | 370/329 |
| 2013/0235733 A1* | 9/2013 | Manssour | 370/241 |
| 2013/0250776 A1* | 9/2013 | Hatefi et al. | 370/243 |

OTHER PUBLICATIONS

"ISI Strategic Research and Innovation Agenda Executive Summary" published on Nov. 2010 at European Technology Platform.

Dr. Afif Osseiran, "Network Coding in Wireless Communications," published on Oct. 4, 2012 at Kth Seminar in Wireless Systems.

Haojie Zhuang et al., "Opportunistic XOR Network Coding for Multihop Data Delivery in Underwater Acoustic Networks", published in OCEANS on Jun. 6-9, 2011.

Harry Tan et al., "Physical Layer Network Coding for Information Exchange Over a Relay Node," Signal Processing and Communication Systems (ICSPCS), 2011 5th International Conference on Dec. 12-14, 2011.

Ryutaroh Matsumoto et al., "Secure Multiplex Network Coding", published on Jun. 5, 2011.

Yonggang Hao et al., "Achievable Rates of Physical Layer Network Coding Schemes on the Exchange Channel", published at Military Communication Conference during Oct. 29-31, 2007.

Alvin Valera et al., "Implementation and Evaluation of Multihop ARQ for Reliable Communications in Underwater Acoustic Networks" published by IEEE in 2009.

Hanxiao Ge "Investigation of LDPC code in DVB-S2" published by the Department of Electrical Engineering at the Institutionen for Systemeknik on Jan. 23, 2012.

Haojie Zhuang et al., "Opportunistic ARQ with Bidirectional Overhearing for Reliable Multihop Underwater Networking" published by IEEE in 2010.

* cited by examiner

FIG. 15
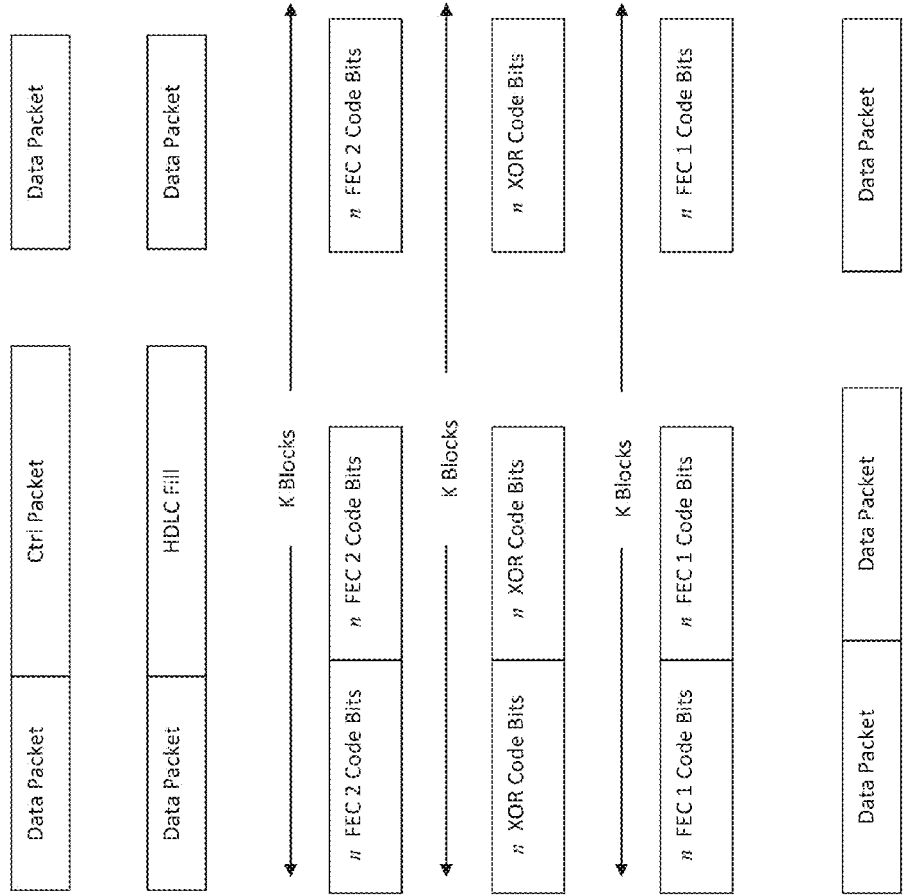
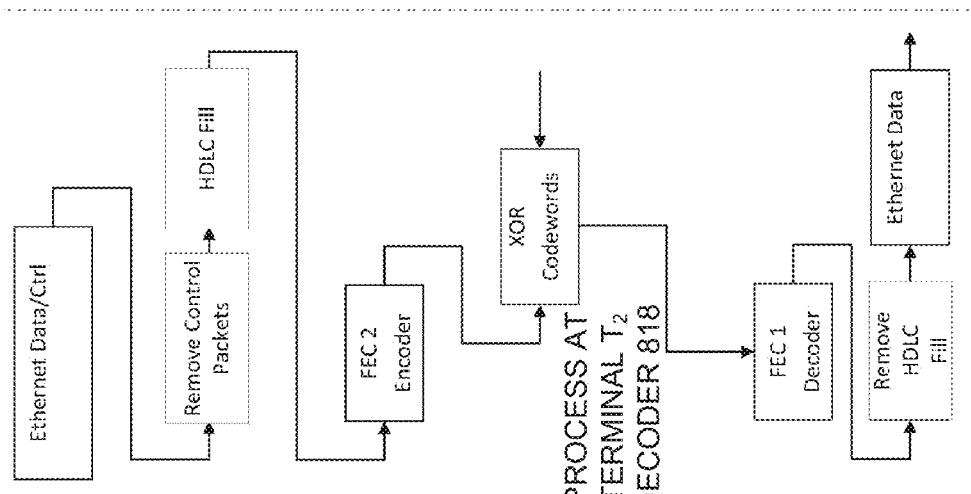

NETWORK CODING FOR SATELLITE COMMUNICATIONS

STATEMENT OF GOVERNMENT INTEREST

This invention was made with government support under Contract No. FA8802-09-C-0001 awarded by the Department of the Air Force. The government has certain rights in the invention.

FIELD

The present invention relates to network coding and, more particularly, to a physical layer network coding architecture that provides downlink (DL) and forward link (FL) capacity increases for satellite network architectures.

BACKGROUND

Satellite network communications capacity is a valuable commodity that should be maximized in all systems. The overall satellite capacity is limited by a downlink (DL) and forward link (FL) depending on the overall system architecture due to frequency and power limitations. There are various ways to improve the DL and FL performance by using a higher gain antenna, dynamic resource allocation (DRA), statistical multiplexing, and other approaches. However, due to cost, complexity, size, and power considerations, the aforementioned approaches may not be practical to improve the DL and FL capacity. Therefore, the limited DL and FL satellite capacity remains a significant problem. Accordingly, an improved way to increase DL and FL satellite capacity may be beneficial.

SUMMARY

Certain embodiments of the present invention may provide solutions to the problems and needs in the art that have not yet been fully identified, appreciated, or solved by current satellite communications architectures. For instance, some embodiments may be directed to physical layer network coding that provides DL capacity increases for satellite network architectures, such as a hub-spoke satellite transponder, a hub-spoke satellite dehop/rehop, and for partially processed, and fully processed, systems.

The use of physical network coding permits the replacement of these DL transmission channels by a single broadcast downlink channel to both user terminals. If the DL data transmission rates to each user terminal are identical, then the broadcast channel data rate is also the same, thereby potentially yielding a fifty percent reduction in required DL satellite capacity for this duplex communication session. In certain embodiments, the physical layer network coding architecture is used in conjunction with forward error correction (FEC) to provide error protection against channel degradations. Media access control (MAC) layer based network coding can also be designed to improve the overall system capacity as well.

In accordance with an embodiment of the present invention, an apparatus is provided. The apparatus includes a first receiver configured to receive an uplink message from a first terminal, and a second receiver configured to receive an uplink message from a second terminal. The apparatus also includes a controller configured to XOR network code the uplink message from the first terminal and the uplink message from the second terminal to produce a XOR network coded message. The XOR network coded message includes the uplink message from the first terminal and the uplink message from the second terminal. The XOR network coded message also includes a frame sequence number of the first terminal and a frame sequence number of the second terminal. The apparatus further includes a transmitter configured to broadcast the XOR network coded message to the first terminal and the second terminal.

In another embodiment, an apparatus is provided. The apparatus includes a controller that is configured to XOR network code a message from a first terminal and a message from a second terminal to generate a XOR network coded message broadcasted to the first terminal and the second terminal. The XOR network coded message includes a frame sequence number of the first terminal and a frame sequence number of the second terminal.

In yet another embodiment, a system is provided. The system includes a network coding controller configured to perform a XOR network coding operation on the information received from a first terminal and second terminal. The network coding controller is further configured to broadcast a single downlink message containing the XOR network coded information to the first and second terminals. The XOR network coded information includes a DL control message intended for the first terminal, and a DL control message intended for the second terminal, a first terminal frame sequence number, a second terminal frame sequence number, the information intended for the first terminal, and the information intended for the second terminal.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 15 illustrates network XOR and FEC decoding of received DL transmissions at terminal $T_2$, according to an embodiment of the present invention.

DETAILED DESCRIPTION OF THE EMBODIMENTS

Generally, data delivery between a first terminal (or node) $T_1$ and a second terminal (or node) $T_2$ may be carried out using a fully processed payload architecture or a virtual payload architecture. For example, in system 100 of FIG. 1, a satellite 105 is configured to process the payload, while in system 200 of FIG. 2, satellite 105 is configured to act as a relay mechanism and a gateway (i.e., a virtual payload) 110 is configured to process the payload. In either case, when first terminal $T_1$ communicates with second terminal $T_2$, first terminal $T_1$ transmits information to a payload of satellite 105. The information includes data $D_{1,2}$ and an uplink (UL) control packet $C_1^U$. Satellite 105 may process the information using the UL control packet $C_1^U$, or relay information to gateway 110 for processing of the information. Once the payload is processed, the processed information is transmitted to second terminal $T_2$. The processed information includes the data $D_{1,2}$ and a downlink control packet $C_2^D$. A similar process is carried out when second terminal $T_2$ sends a communication to first terminal $T_1$.

Figure 1:
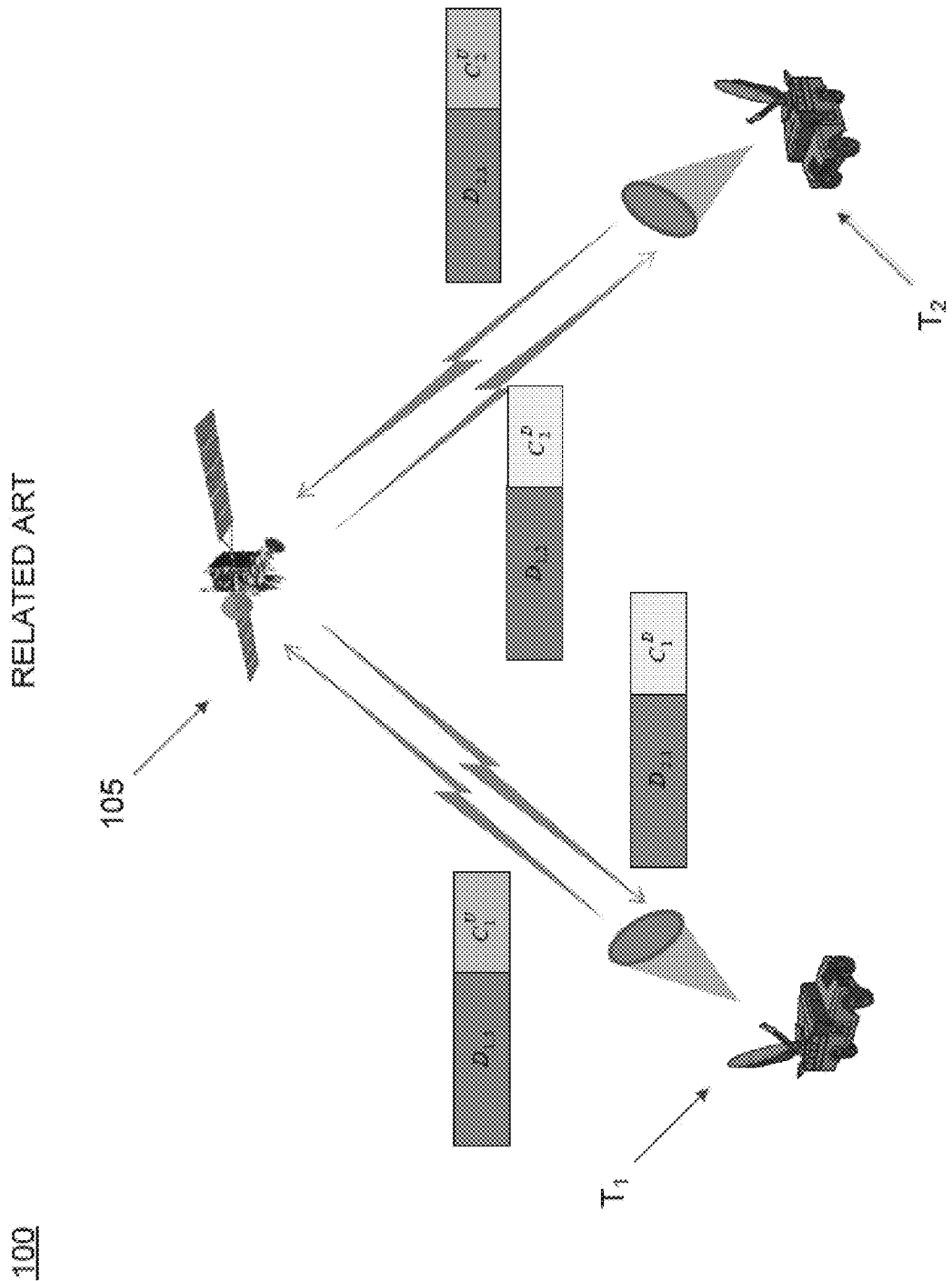
FIG. 1 is related art illustrating a conventional fully processed payload architecture for data delivery without network coding.
Figure 2:
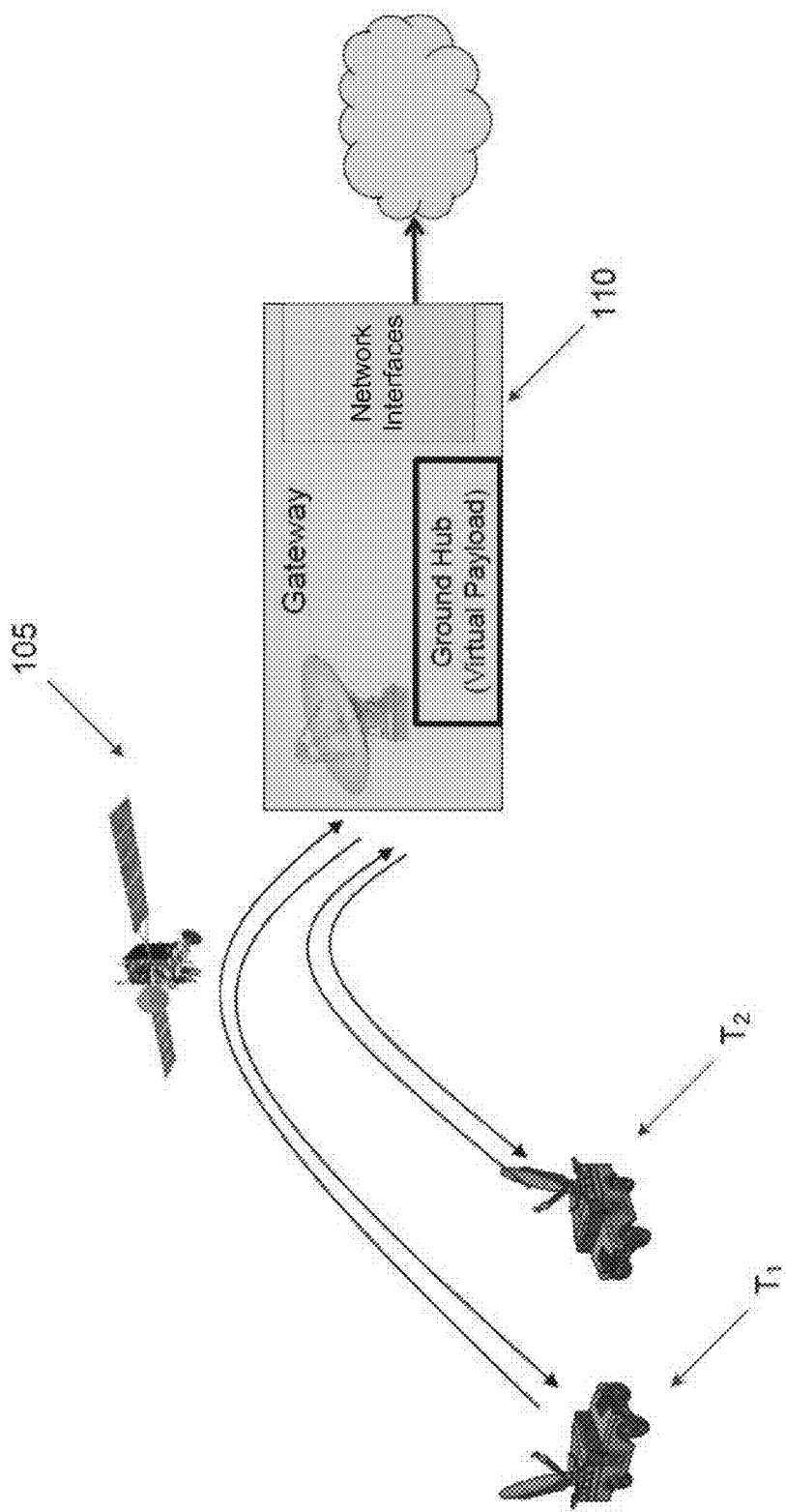
FIG. 2 is related art illustrating a conventional virtual payload on the ground architecture without network coding.

However, it should be noted that satellite power and bandwidth are limited. Thus, when processing the information using the conventional approach as shown in FIGS. 1 and 2, the limited satellite power and bandwidth result in limited downlink (DL) capacity.

Embodiments of the present invention overcome capacity issues by increasing capacity using a physical layer network coding architecture. It should be appreciated that either terminal $T_1$ or $T_2$ may initiate a physical layer network coding session, and/or the network coding controller within gateway 110 may initiate the network coding session. Similarly, either terminal $T_1$ or $T_2$ or network coding controller may terminate the network coding session. It should further be appreciated that network coding operation may be initiated at any time during communication.

Figure 3:
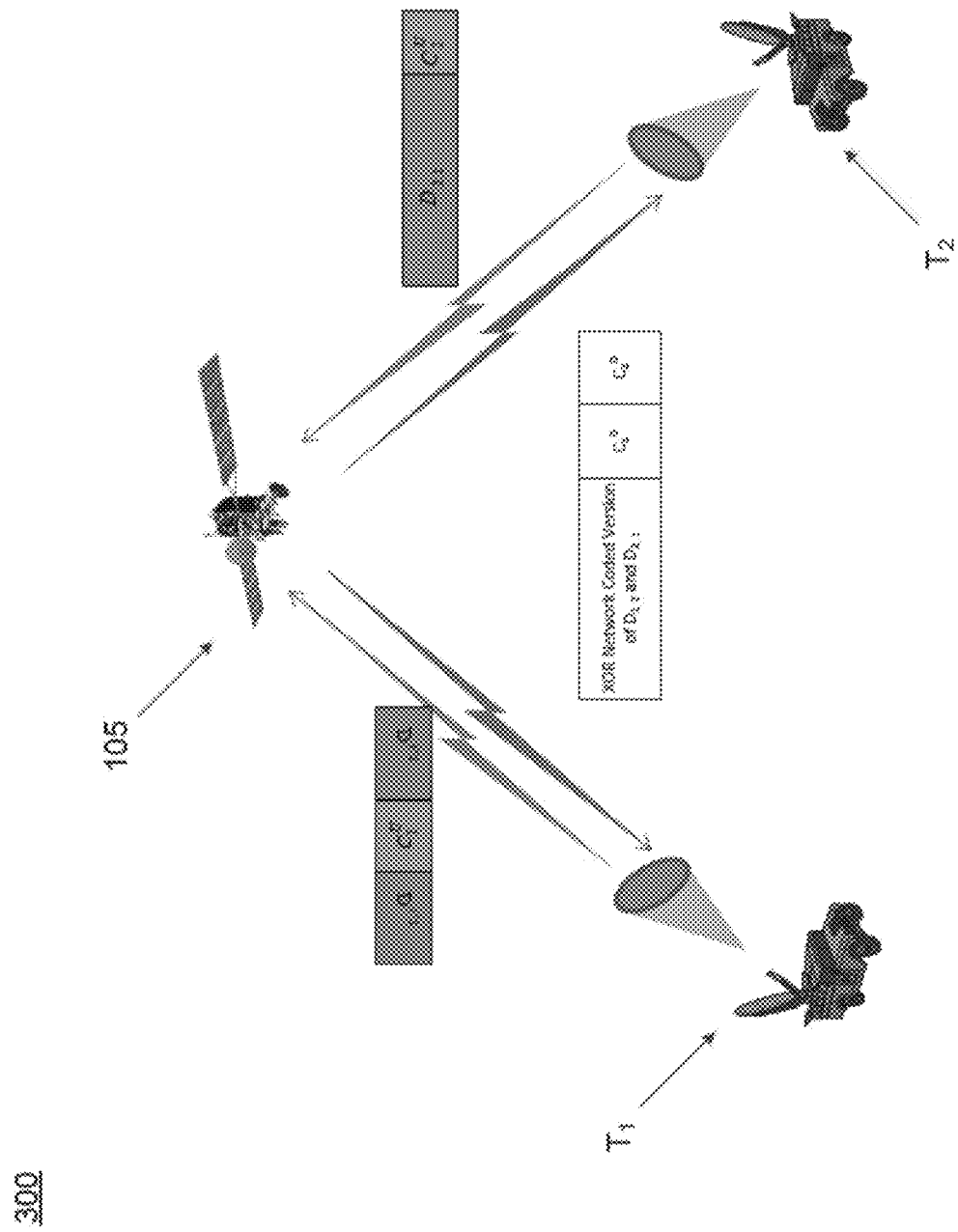
FIG. 3 illustrates a fully processed payload architecture using a physical layer network coding approach, according to an embodiment of the present invention.

FIG. 3 illustrates a fully processed payload architecture 300 using a physical layer network coding approach, according to an embodiment of the present invention. In this embodiment, when terminal $T_1$ wants to communicate with terminal $T_2$, terminal $T_1$ transmits information, including $D_{1,2}$ and UL control packet $C_1^U$, to a payload of satellite 105. At, or near, the same time, when terminal $T_2$ wants to communicate with terminal $T_1$, terminal $T_2$ transmits information, including $D_{2,1}$ and UL control packet $C_2^U$, to the payload of satellite 105.

Satellite 105, or the network coding controller (shown in FIG. 8) located within satellite 105, may process the information received from terminal $T_1$ and terminal $T_2$, i.e., perform a XOR network coding operation on the information received from terminal $T_1$ and terminal $T_2$. Satellite 105 may then broadcast the processed information to terminal $T_1$ and terminal $T_2$, i.e., broadcast a single downlink message containing the XOR network coded information. Terminal $T_1$ and terminal $T_2$ may process the received broadcast downlink message to retrieve the desired information at each terminal $T_1$, $T_2$. This process is more fully described below with respect to FIGS. 6-23.

Figure 4:
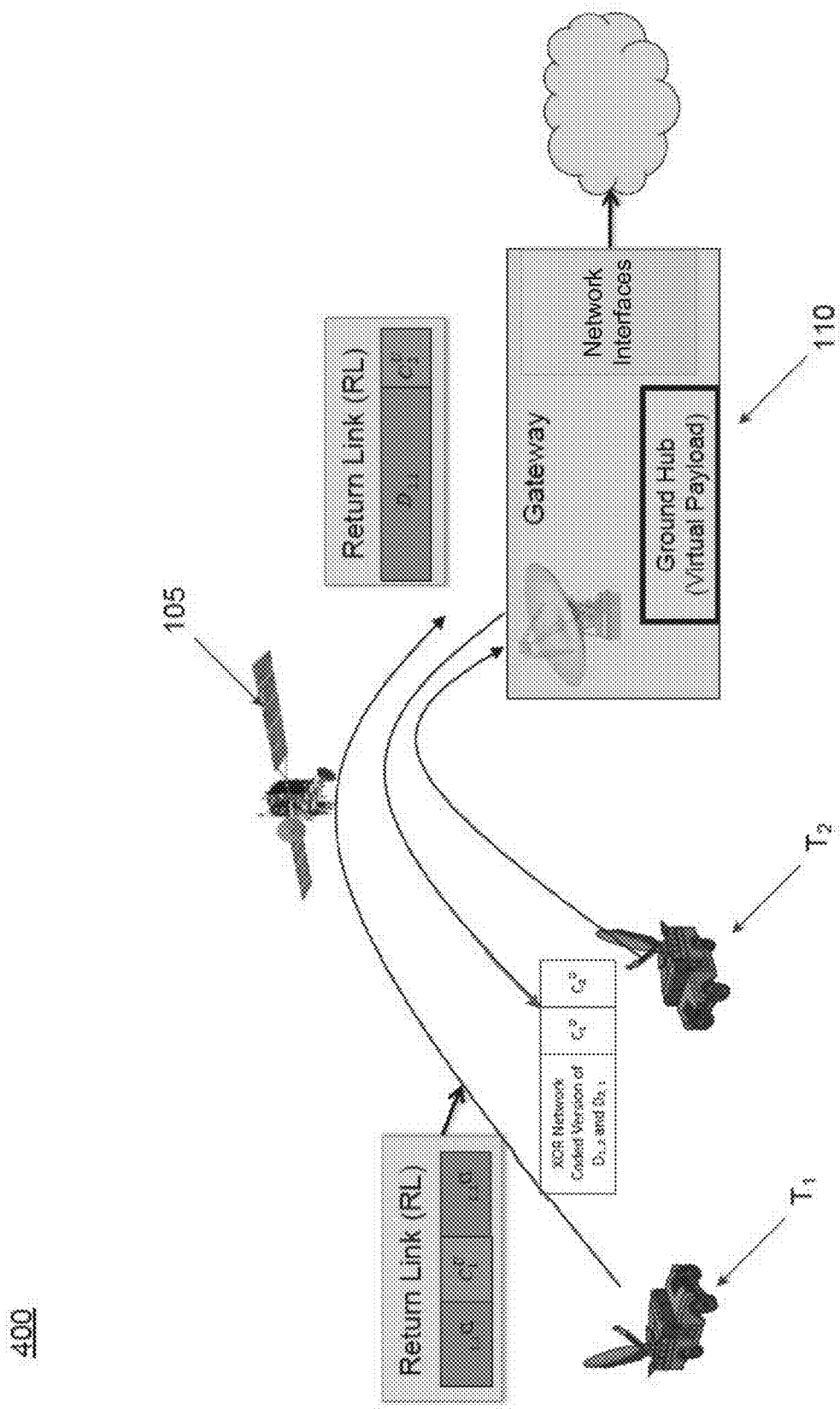
FIG. 4 illustrates a virtual payload on the ground architecture using a physical layer network coding approach, according to an embodiment of the present invention.

FIG. 4 illustrates a virtual payload on the ground architecture 400 using a physical layer network coding approach, according to an embodiment of the present invention. In this embodiment, terminal $T_1$ and terminal $T_2$ transmit information to satellite 105, and satellite 105 relays the received information to a virtual payload of gateway 110 for processing. In other embodiments, terminal $T_1$ or terminal $T_2$ may transmit information to satellite 105. Gateway 110, or the network coding controller located within gateway 110, may process (i.e., perform the XOR network coding on) the information received from terminal $T_1$ and terminal $T_2$. Ground system 110 may then broadcast the processed information, via satellite 105, to terminal $T_1$ and terminal $T_2$.

Figure 5:
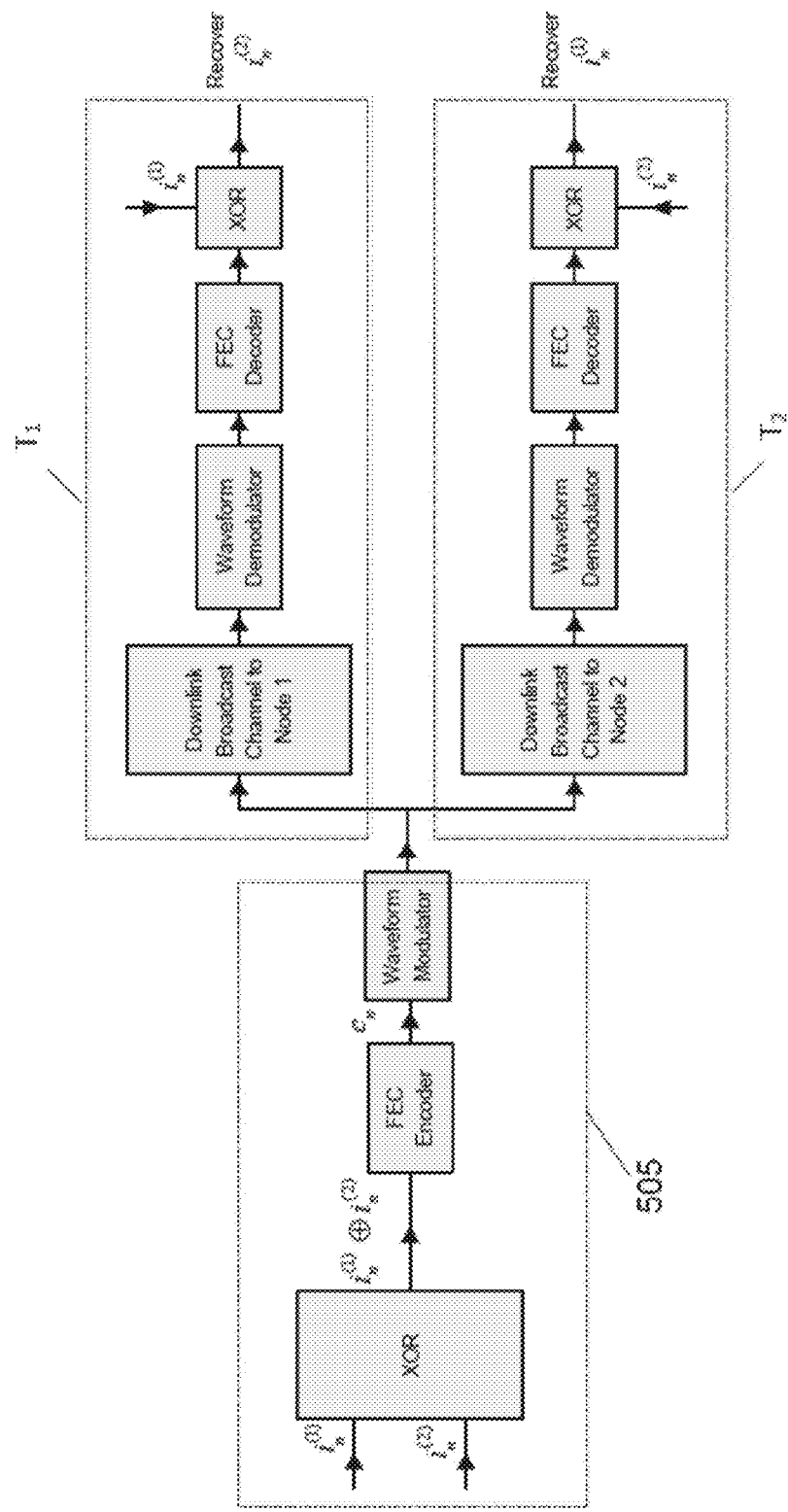
FIG. 5 is related art illustrating a conventional XOR network coding approach.

FIG. 5 is related art illustrating a conventional XOR network coding approach 500. In conventional XOR network coding approach 500, information sequences $\{i_n^{(1)}\}$ and $\{i_n^{(2)}\}$ are XORed together to form a data sequence $\{i_n^{(1)} \oplus i_n^{(2)}\}$. This data sequence is then delivered by network hub 505 to the receivers at terminals $T_1$, $T_2$ in a single DL broadcast transmission. In wireless networks, the DL radio propagation channels from network hub 505 to each terminal $T_1$, $T_2$ may experience noisy fading transmission impairments that result in unreliable links with channel errors.

In these applications, the XORed data sequence $\{i_n^{(1)} \oplus i_n^{(2)}\}$ will generally have to be encoded with a physical layer FEC of code rate R<1 at network hub 505 to combat these channel errors. The resulting forward error correction (FEC) code sequence $\{c_n\}$ is then modulated by a transmitter at network hub 505 and delivered to the receivers at terminals $T_1$, $T_2$ through a single broadcast transmission. The received signals at each of these terminals $T_1$, $T_2$ are first demodulated and then FEC decoded to obtain decoded versions of the XORed data sequence $\{i_n^{(1)} \oplus i_n^{(2)}\}$. The FEC decoded version of the data sequence is then XORed with the known information sequences to recover decoded versions of the information sequences $\{i_n^{(2)}\}$ and $\{i_n^{(1)}\}$ at terminals $T_1$, $T_2$, respectively.

It should be appreciated that the DL transmission channels from network hub 505 to each terminal $T_1$, $T_2$ may have different reliability levels due to different received signal-to-noise ratios (SNRs). In the conventional XOR network coding approach, as shown in FIG. 5, the FEC code rate R should be chosen to accommodate the worst DL channel, that is, the channel with the lowest received SNR. Since the DL channel with the higher received SNR can accommodate a higher code rate for the same prescribed bit error rate (BER) performance, this can result in a substantial decrease in the achievable information transmission rate that can be delivered to the terminal with the higher received SNR downlink channel. Consequently, this asymmetry in the downlink channel reliabilities from network hub 505 to terminals $T_1$, $T_2$ reduces the potential capacity gain that can be achieved by using the conventional network coding scheme.

Figure 6:
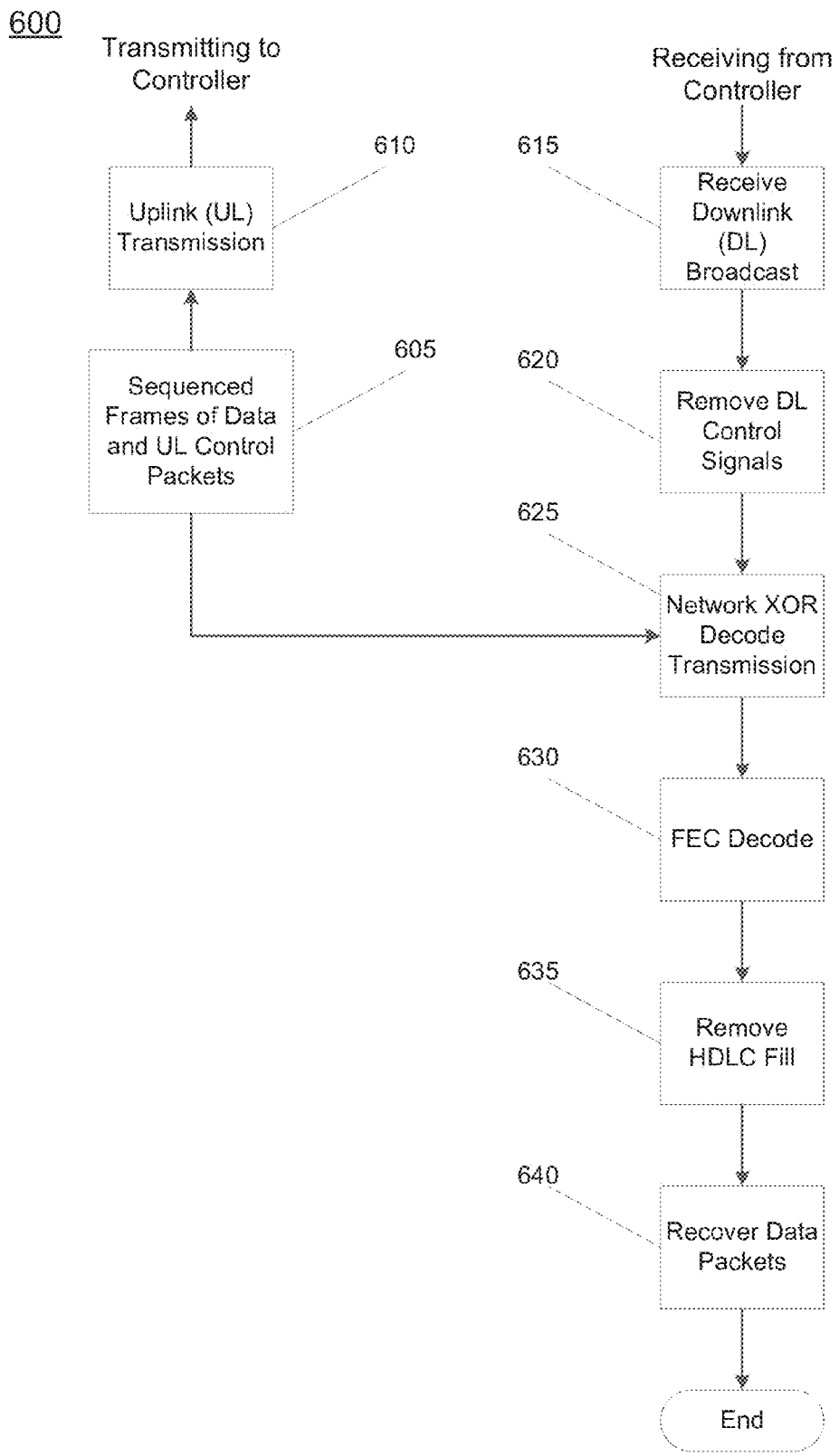
FIGS. 6 and 7 are flowcharts illustrating a physical layer network coding approach, according to an embodiment of the present invention.
Figure 7:
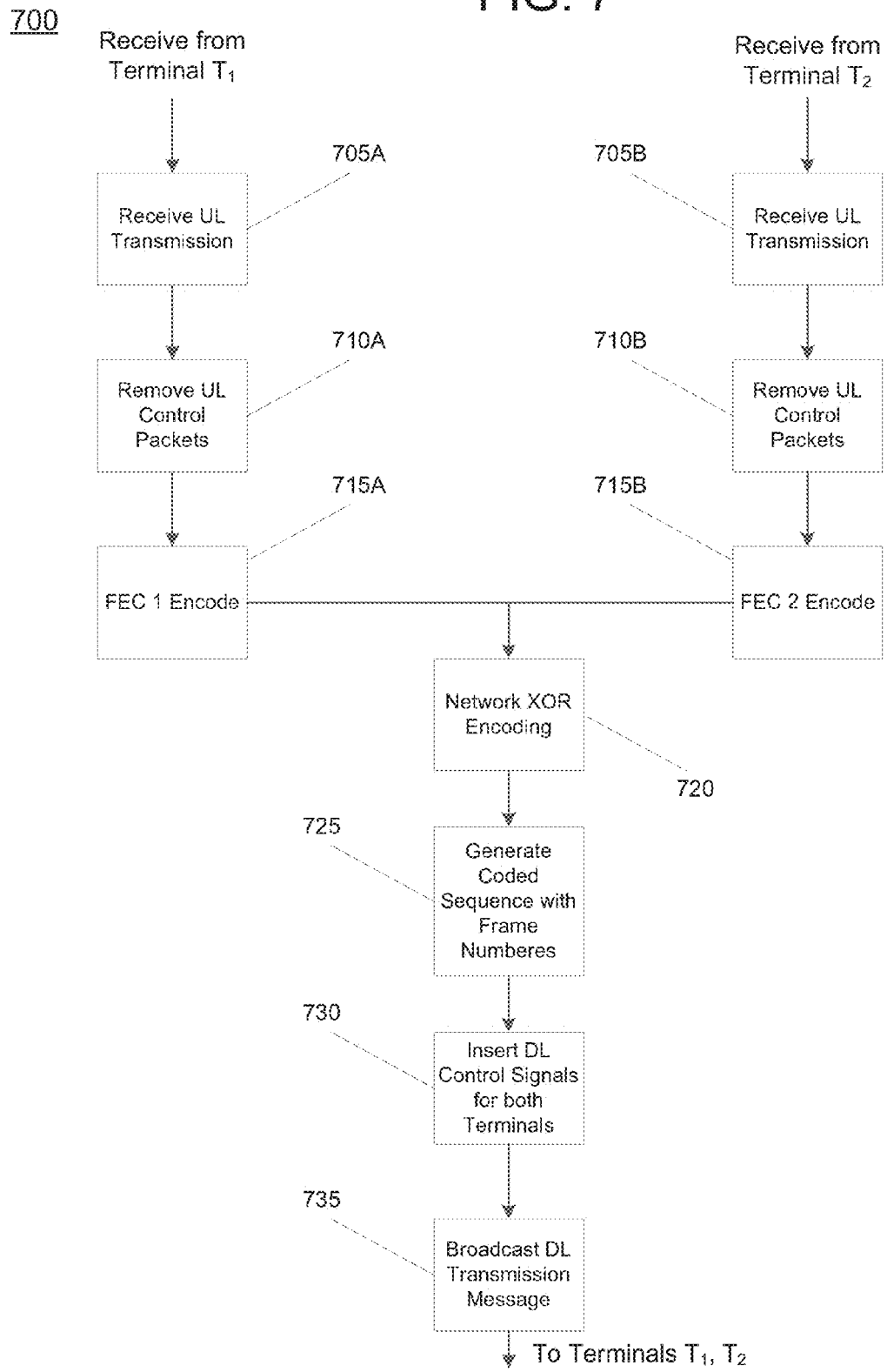

Embodiments of the present invention identify a physical layer network coding approach that removes this limitation. FIGS. 6 and 7 are flowcharts 600 and 700 illustrating a physical layer network coding approach, according to an embodiment of the present invention. It should be appreciated that the process shown in FIG. 6 may be executed by a processor of a terminal, and the process shown in FIG. 7 may be executed by a processor at the network coding controller.

In this embodiment, in order for terminal $T_1$ to communicate with terminal $T_2$, the processor at terminal $T_1$ may assign frame sequence numbers to the data packets and control packets (also known as a transmission message) at 605 and send a UL transmission message to the network coding controller at 610. A similar process is executed by the processor at terminal $T_2$ when terminal $T_2$ communicates with terminal $T_1$.

Moving to FIG. 7, the network coding controller may receive the UL transmission message from terminal $T_1$ at 705A and receive the UL transmission message from terminal $T_2$ at 705B. The network coding controller may then remove and replace the UL control packets in each of the UL transmission messages with high level data link control (HDLC) fill characters at 710A, 710B, and, separately, DL FEC encode at 715A, 715B the data packets and HDLC fill characters in each transmission message to generate DL FEC encoded bits. For example, the transmission message from terminal $T_1$ is DL FEC 1 encoded, while the transmission message from terminal $T_2$ is DL FEC 2 encoded.

At 720, the network coding controller may perform a network XOR encoding operation to the DL FEC 1 encoded bits and the DL FEC 2 encoded bits, and generate at 725 a DL XOR network coded sequence containing the data packets from the transmission message from terminal $T_1$ and the data packets from the transmission message from terminal $T_2$ along with the frame sequence numbers previously assigned by terminal $T_1$ and terminal $T_2$, respectively. At 730, the network coding controller may insert into the transmission message DL control signals for terminal $T_1$ and DL control signals for terminal $T_2$. Finally at 735, the network coding controller may broadcast the DL transmission message containing encoded transmission messages to both terminal $T_1$ and terminal $T_2$.

Returning to FIG. 6, terminal $T_1$, for example, may receive the DL transmission message from the network coding controller at 615, and remove the DL control signals inserted by the network coding controller at 620. As noted above, terminal $T_1$ previously transmitted the UL transmission message intended for terminal $T_2$. This UL transmission message is network XOR decoded with the received DL XOR network coded transmission message at 625, and then FEC 2 decoded to obtain the intended transmission message from terminal $T_2$ at 630. Because the intended transmission message included HDLC fill characters previously inserted by network coding controller NCC at step 710A and step 710B (as shown in FIG. 7), terminal $T_1$ may remove the HDLC fill characters at 635 to recover the data packets transmitted by terminal $T_2$ at 640. It should be appreciated that terminal $T_2$ may undergo a similar process to recover the data packets sent by terminal $T_1$.

The steps shown in FIGS. 6 and 7 may be performed, in part, by a computer program, encoding instructions for a nonlinear adaptive processor to cause at least the processes described in FIGS. 6 and 7 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 6 and 7, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, digital signal processor, or an application specific integrated circuit ("ASIC").

Figure 8:
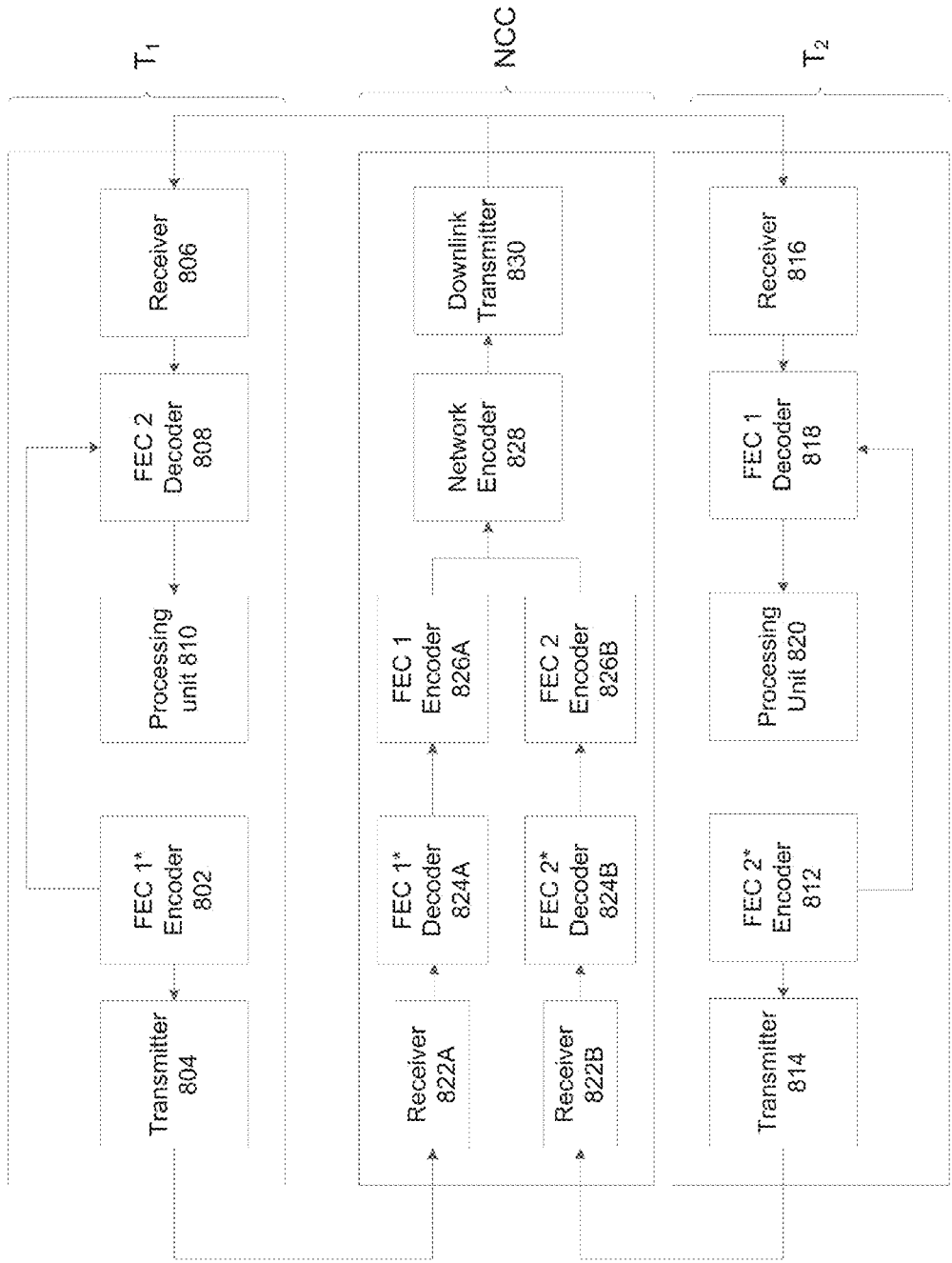
FIG. 8 is a block diagram illustrating a system diagram for physical layer network coding, according to an embodiment of the present invention.

FIG. 8 is a block diagram 800 illustrating a system for network coding, according to an embodiment of the present invention. The system, in this embodiment, includes terminal $T_1$, terminal $T_2$, and network coding controller (hereinafter "controller") NCC. Controller NCC may reside in a satellite, a gateway, or any structure or vehicle that would be appreciated by a person of ordinary skill in the art. Controller NCC allows exchange of information between a terminal $T_1$ and terminal $T_2$. Furthermore, controller NCC may include a processor (not shown) that is configured to cause controller NCC, or various devices within controller NCC, to execute functions allowing exchange of information between processing units (or processors) 810 and 820 of terminals $T_1$, $T_2$, respectively.

In this embodiment, a dedicated duplex communications session between terminals $T_1$, $T_2$ is employed using a physical layer XOR network coding architecture. This allows for a single DL broadcast channel, rather than two separate downlink transmission channels, to both terminals $T_1$, $T_2$.

It should be appreciated that in military satellite communication networks, a universal timing architecture can be employed for the entire system, i.e., between the controller NCC and terminals $T_1$, $T_2$, to achieve network coding synchronization. In commercial regenerative satellite payload networks, a framing structure may be utilized to achieve network coding synchronization. The following description will discuss both architectures.

Protected Military Satellite Communications Networks

At terminal $T_1$, prior to transmission of an UL information stream to controller NCC, at least one UL control packet may be encapsulated into at least one Ethernet control packet. The encapsulated UL control packets are then inserted into the UL information stream. The UL information stream may include the Ethernet data packets intended for transmission to the second terminal $T_2$, as well as the UL control packets intended for controller NCC. An FEC encoder 802 may FEC 1* encode the UL information stream at terminal $T_1$ into FEC 1* coded bits. See, for example, FIG. 9. A similar process may be executed by terminal $T_2$. See also FIG. 9.

Figure 9:
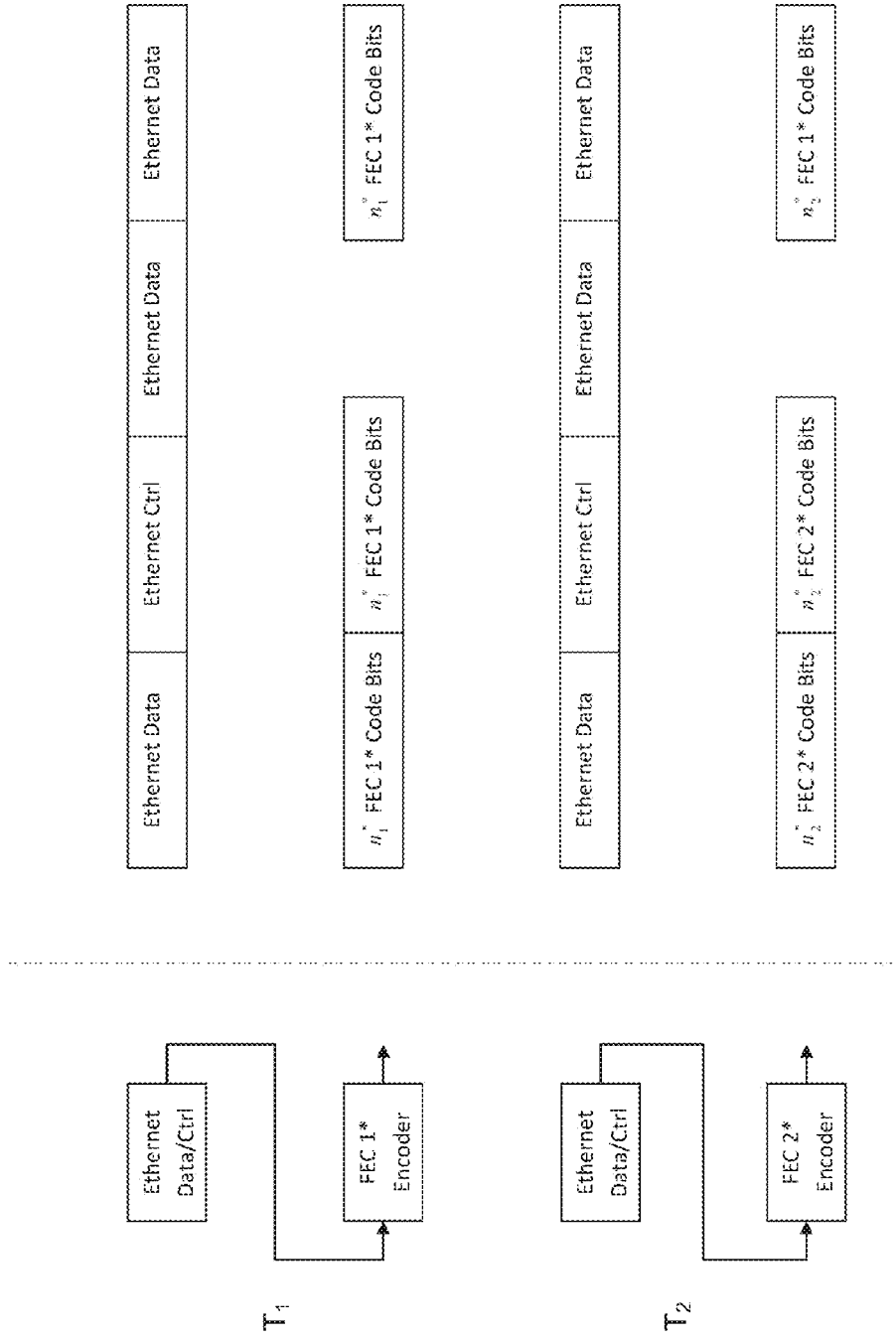
FIG. 9 illustrates uplink (UL) forward error correction (FEC) encoding at terminals $T_1$ and $T_2$, according to an embodiment of the present invention.
Figure 10:
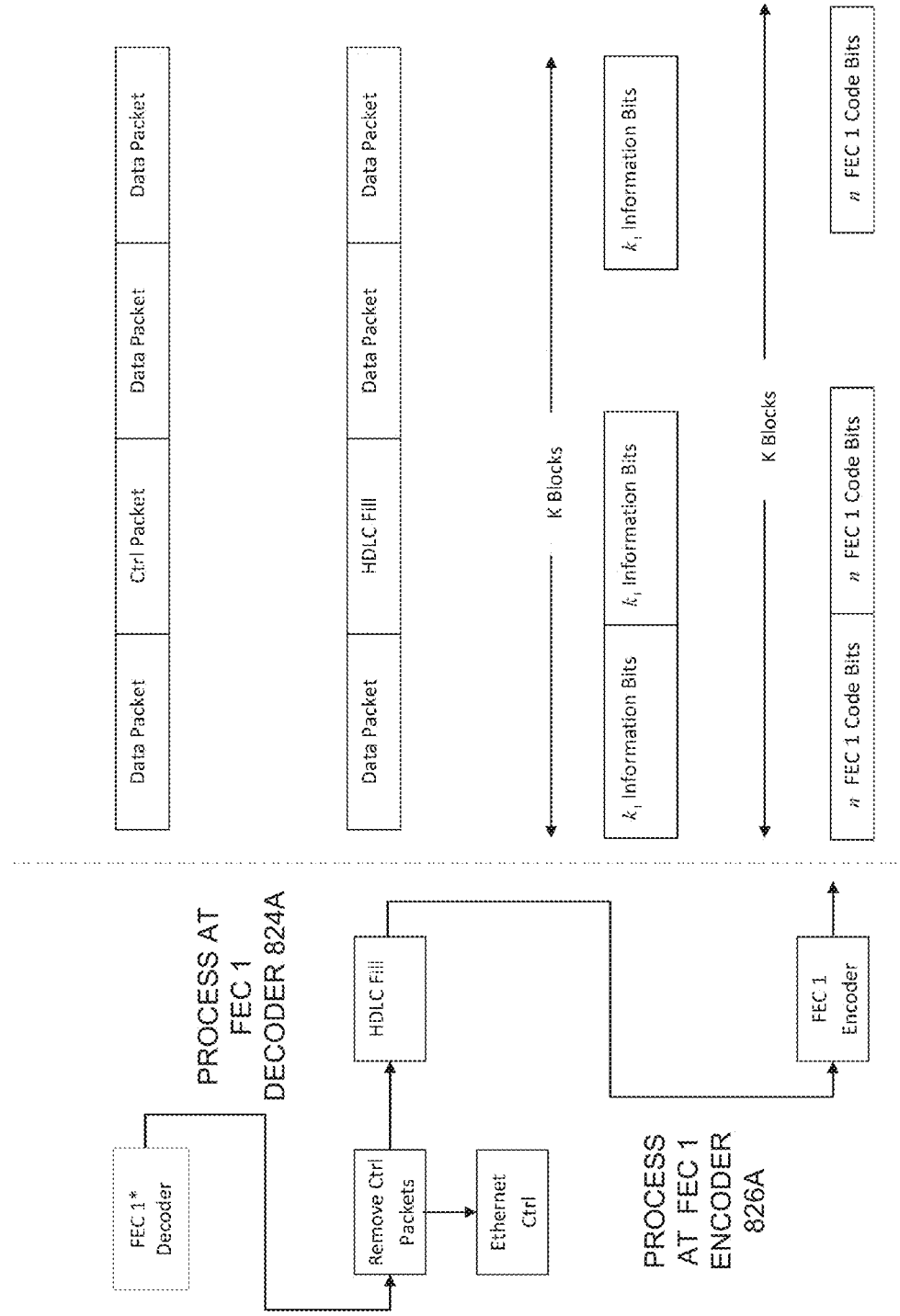
FIG. 10 illustrates a control packet remove and downlink (DL) FEC 1 encoding of a UL transmission from terminal $T_1$, according to an embodiment of the present invention.
Figure 11:
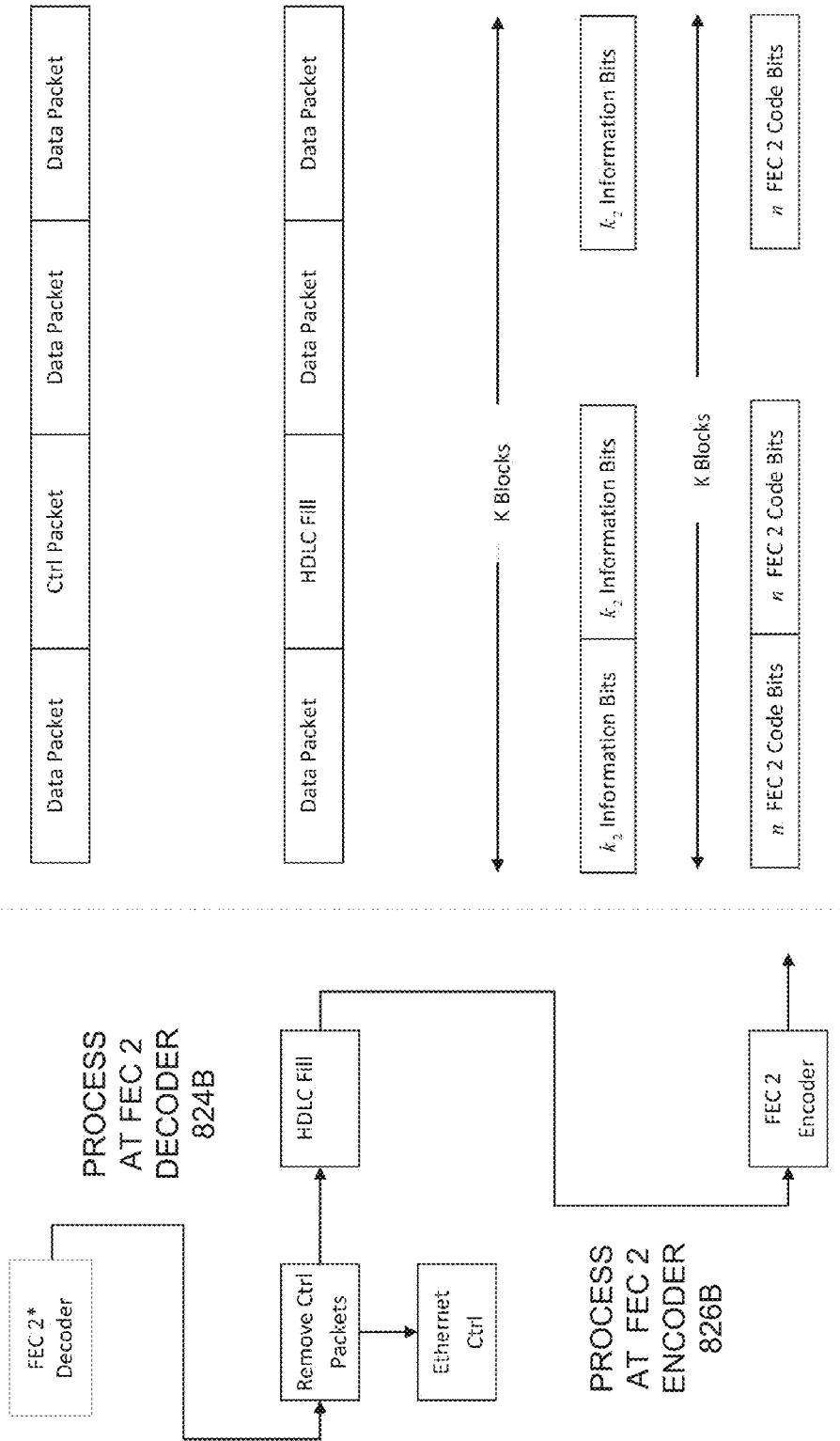
FIG. 11 illustrates control packet removal and downlink (DL) FEC 2 encoding of a UL transmission from terminal $T_2$, according to an embodiment of the present invention.
Figure 12:
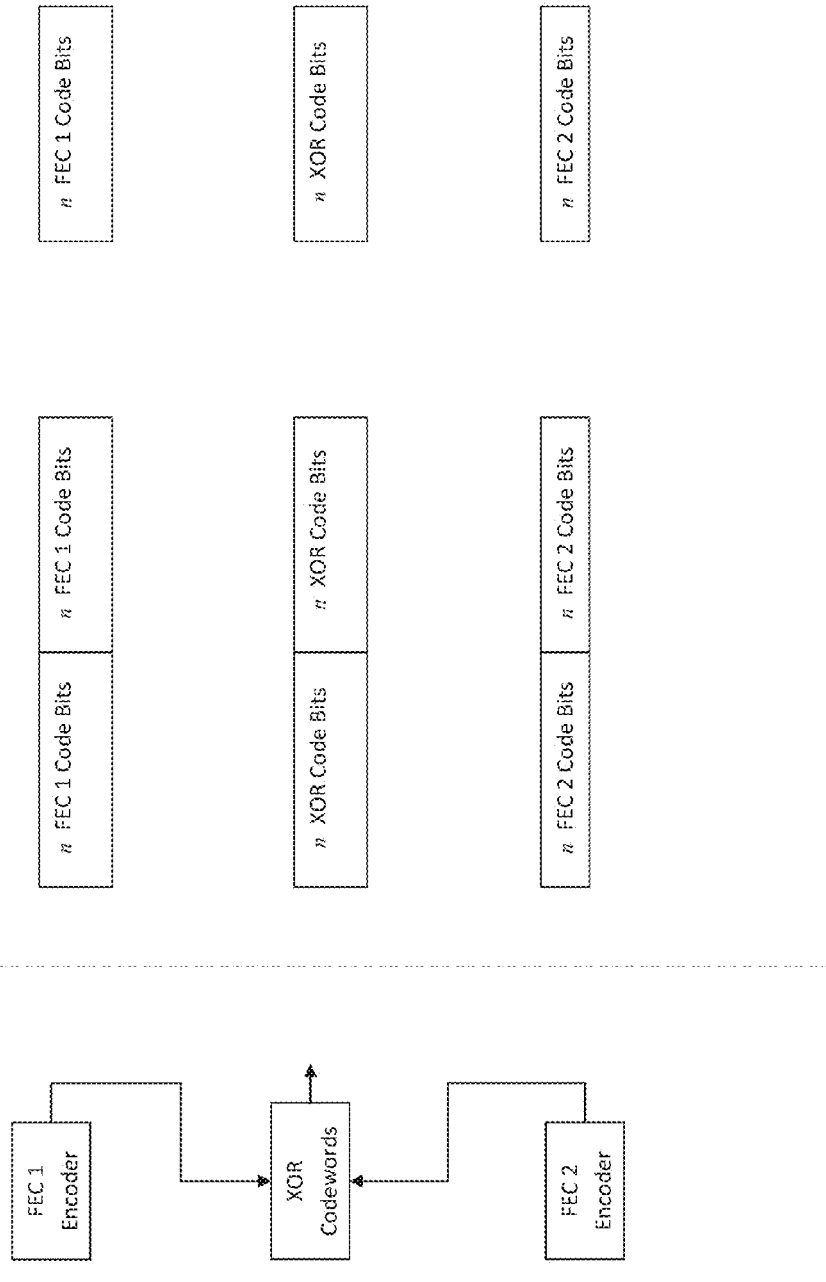
FIG. 12 illustrates DL XOR network coding (NC) encoding at controller, according to an embodiment of the present invention.

Stated differently, FIG. 9 shows an UL information stream at terminal $T_1$ containing both data packets and UL control packets, and an UL information stream at terminal $T_2$ containing both data packets and UL control packets. The data packets and the control packets are FEC encoded generating FEC coded bits. The UL information stream at terminal $T_1$ containing the FEC 1* coded bits may then be transmitted by UL transmitter 804. Similarly, the UL information stream at terminal $T_2$ containing the FEC 2* coded bits may then be transmitted by UL transmitter 814.

UL transmitter 804 may then transmit the UL information stream from $T_1$ to an UL receiver 822A at controller NCC, and an UL transmitter 814 may also transmit UL information stream from $T_2$ to an UL receiver 822B at controller NCC. FEC 1* Decoder 824A may decode the FEC 1* coded bits to recover the data packets and the UL control packets in the UL information stream from terminal $T_1$ and, similarly, FEC 2* decoder 824B may decode the FEC 2* coded bits to recover the data packets and the UL control packets in the UL information stream from terminal $T_2$. Because the objective is to incorporate physical layer network coding on the DL transmission broadcasted from controller NCC to both terminals $T_1, T_2$, the UL control packets are removed and replaced with HDLC fill characters. See, for example, FIGS. 10 and 11.

Next, FEC 1 encoder 826A FEC 1 encodes the data packets and the HDLC fill characters in the UL information stream to produce FEC 1 coded bits, and, separately, FEC 2 encoder 826B FEC 2 encodes the data packets and the HDLC fill characters in the UL information stream from terminal $T_2$ to produce FEC 2 coded bits. Stated differently, the information streams from both terminals $T_1, T_2$ now comprise of FEC coded bits. See, for example, FIGS. 10 and 11.

This allows for FEC 1 encoder 826A and FEC 2 encoder 826B to generate code sequence $\{c_n^{(1)}\}$ and code sequence $\{c_n^{(2)}\}$ for the Ethernet data packets and HDLC fill characters in the UL information stream from each terminal $T_1, T_2$. It should be appreciated that the FEC 1 code rate, in this embodiment, is $r_1=k_1/n_1$, wherein $k_1$ is the number of information bits and $n_1$ is the number of code bits in each code word of FEC 1. Similarly, FEC 2 code rate, in this embodiment is $r_2=k_2/n_2$.

XOR network encoder 828 (or XOR encoder) receives the FEC 1 coded bits (i.e., code sequence $\{c_n^{(1)}\}$) from FEC encoder 826A and FEC 2 coded bits (i.e., code sequence $\{c_n^{(2)}\}$) from FEC 2 encoder 826B, and performs a DL XOR physical network coding to generate XOR coded bits (i.e., coded sequence $\{c_n^{(1)} \oplus c_n^{(2)}\}$). Stated differently, a DL information stream includes XOR coded bits of the information streams from terminals $T_1$ and $T_2$. See, for example, FIG. 12.

Figure 13:
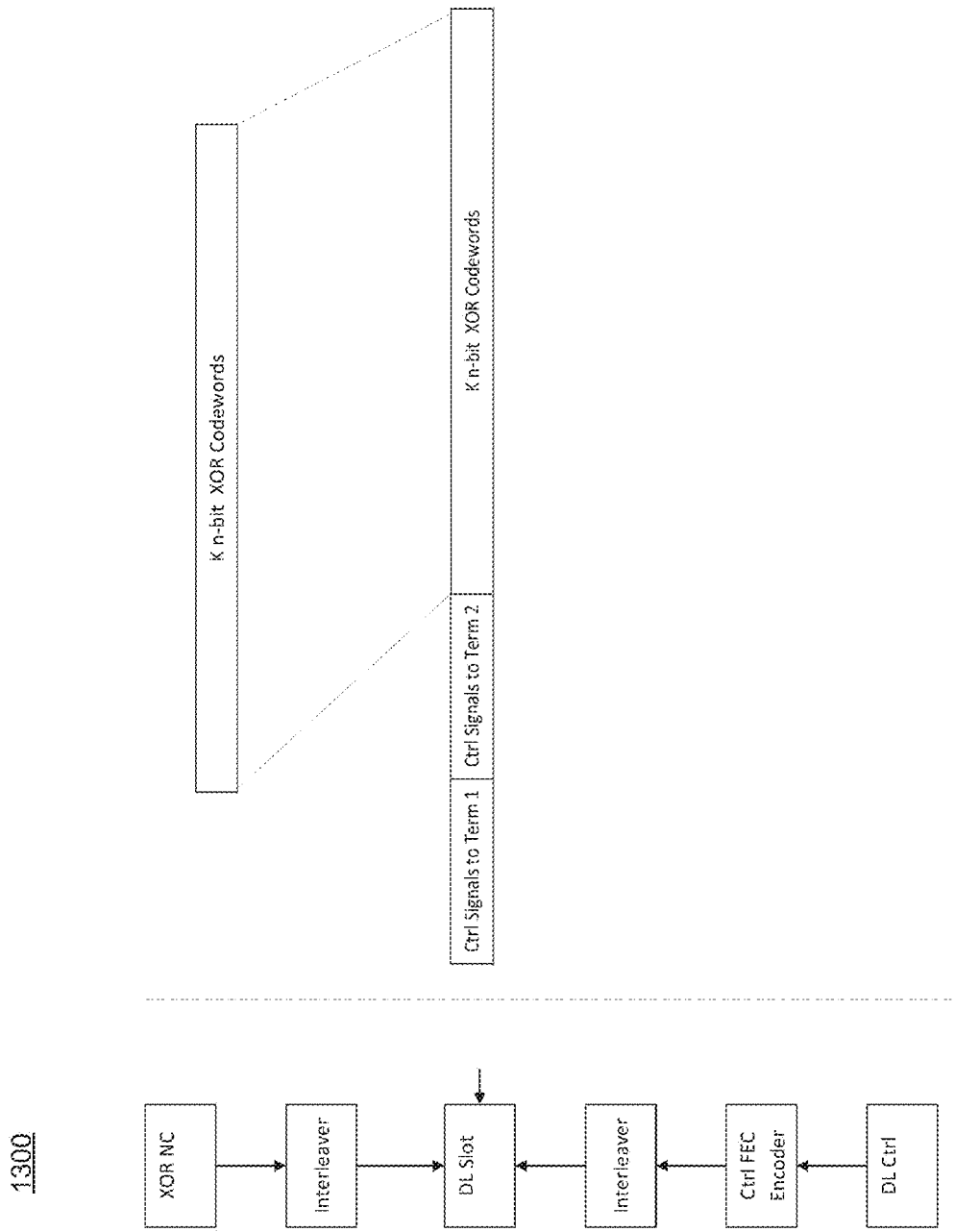
FIG. 13 illustrates DL slot assignment for codeword and control signals for terminals $T_1$ and $T_2$, according to an embodiment of the present invention.

Because Ethernet packets encapsulating the DL control packets for each terminal $T_1, T_2$ cannot be network encoded, the DL control packets are separated from the XOR coding stream. That is, the DL control packets are encoded using another FEC encoder and interleaver prior to insertion into predetermined slots of the DL information stream. See, for example, FIG. 13. The XOR coded stream is also interleaved and inserted in the DL information stream as shown in FIG. 13. It should be appreciated that the other FEC encoder and interleaver may reside in network encoder 828 or may reside as separate devices in controller NCC. The DL information stream may then be modulated and frequency hopped (as is employed in military satellite communications) prior to transmission (or broadcast) to terminals $T_1, T_2$. Finally, downlink transmitter 830 may broadcast the DL information stream to terminals $T_1, T_2$.

Figure 14:
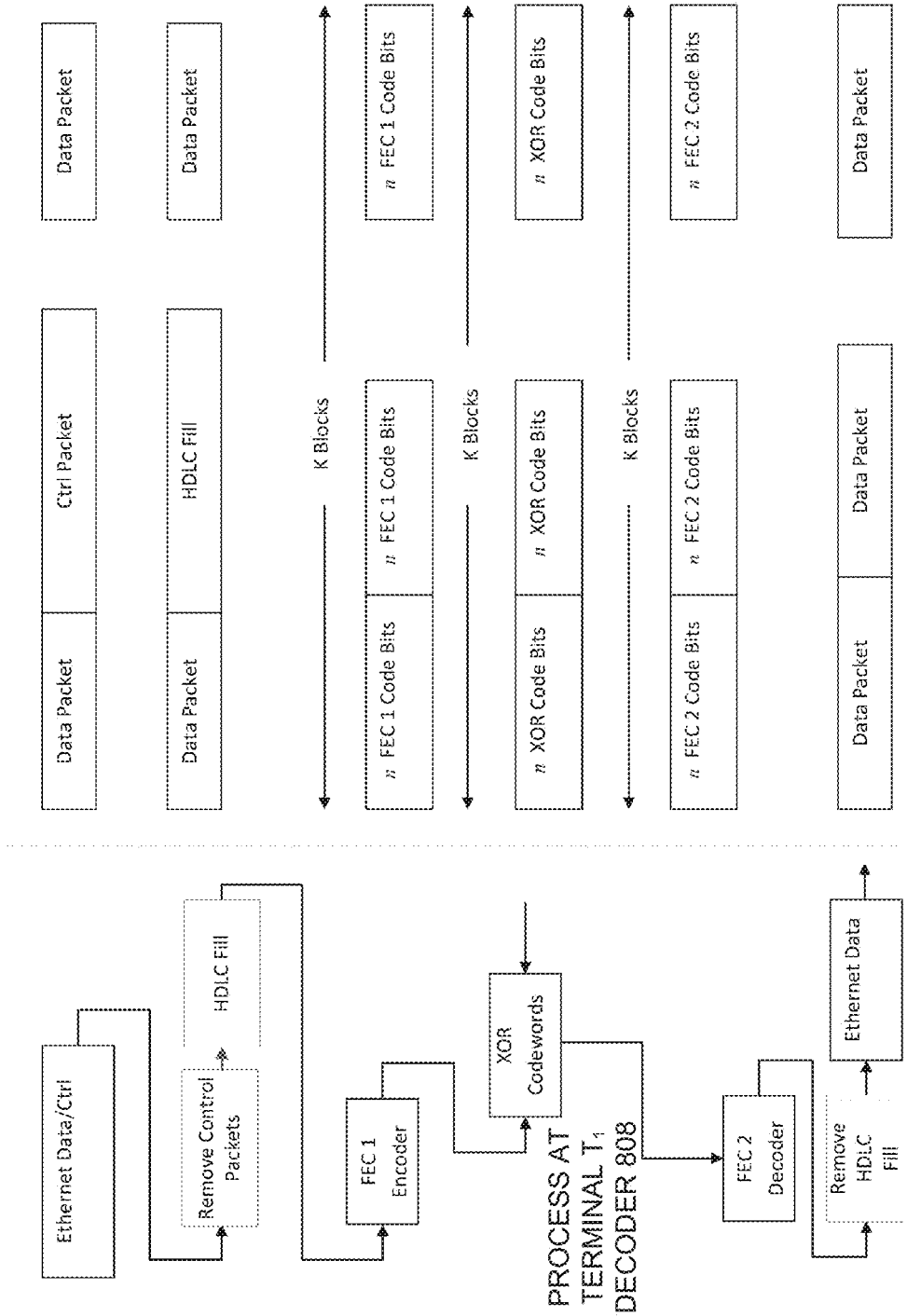
FIG. 14 illustrates network XOR and FEC decoding of received DL transmissions at terminal $T_1$, according to an embodiment of the present invention.

Receivers 806 and 816 may receive the broadcasted DL information stream. As previously discussed, the FEC 1* and FEC 2* encoded UL information streams that were previously transmitted from terminals $T_1, T_2$ include data packets intended for transmission, as well as UL control packets intended for controller NCC. In order for terminals $T_1, T_2$ to decipher their respective intended messages from the received broadcasted DL information stream, each terminal $T_1, T_2$ first removes the UL control packets from its UL information stream, and replaces the UL control packets with HDLC fill characters to create a modified information stream. This process may be executed by FEC 1* encoder 802 and FEC 2* encoder 812, and/or decoders 808, 818, respectively. Next, terminal $T_1$ FEC 1 encodes the data packets and the HDLC fill characters in its modified UL information stream to generate FEC 1 coded bits, and, similarly, terminal $T_2$ FEC 2 encodes the data packets and the HDLC fill characters in its modified UL information stream to generate FEC 2 coded bits. This process may also be executed by FEC 1* encoder 802 and FEC 2* encoder 812, and/or decoders 808, 818, respectively. FIGS. 14 and 15 show, for example, the process of replacing the control packet with HDLC fill characters, as well as generating the FEC coded bits in the modified UL information stream at terminals $T_1$ and $T_2$ respectively.

The FEC coded bits may then be used to recover the intended FEC coded bits from the received broadcast DL information stream. For example, decoder 808 may XOR the FEC 1 coded bits with the XOR coded bits in the received broadcast DL information stream to recover the FEC 2 coded bits generated by FEC 2 encoder 826B. Similarly, decoder 818 may XOR the FEC 2 coded bits with the XOR coded bits in the received broadcast DL information stream to recover the FEC 1 coded bits generated by FEC 1 encoder 826A. Subsequently, FEC 2 decoder located within decoder 808 may decode the recovered FEC 2 coded bits, and remove the HDLC fill characters, to recover the data packets transmitted from terminal $T_2$. An FEC 1 decoder located within decoder 818 may also perform a similar function to recover the data packets transmitted from terminal $T_1$. See, for example, FIGS. 14 and 15, which show the process of recovering the intended data packets at terminals $T_1, T_2$, respectively.

Commercial Regenerative Satellite Payload Networks

Although most of the networking coding architecture described above is employed in this embodiment, frequency hopping, and slot universal timing reference may not be utilized. Instead, a different architecture for achieving code synchronization with respect to physical layer XOR network coding is described below. For instance, some embodiments utilize a fixed length framing structure for each UL information stream transmitted by terminals $T_1, T_2$ to achieve code synchronization. See, for example, FIGS. 16 and 17.

These frames can be uniquely identified by including a source terminal identifier and corresponding frame sequence numbers in the frame headers. See, for example, FIGS. 16 and 17. Since the received UL transmissions from terminals $T_1, T_2$ can be demodulated and FEC decoded at controller NCC, and re-FEC encoded for DL transmissions back to terminals $T_1, T_2$, the DL encoded FEC codewords can be XOR network coded prior to being broadcast to terminals $T_1, T_2$. The network coding frames can then use the corresponding source identifiers and UL information stream frame sequence numbers to allow the receiving terminals $T_1, T_2$ to synchronize and determine precisely which portion of its UL information stream is used in the network coding frame and, thus, allow the destination receiving terminals $T_1, T_2$ to decode its received data.

Below is a detailed description of the code synchronization process for commercial regenerative satellite payload networks.

Figure 16:
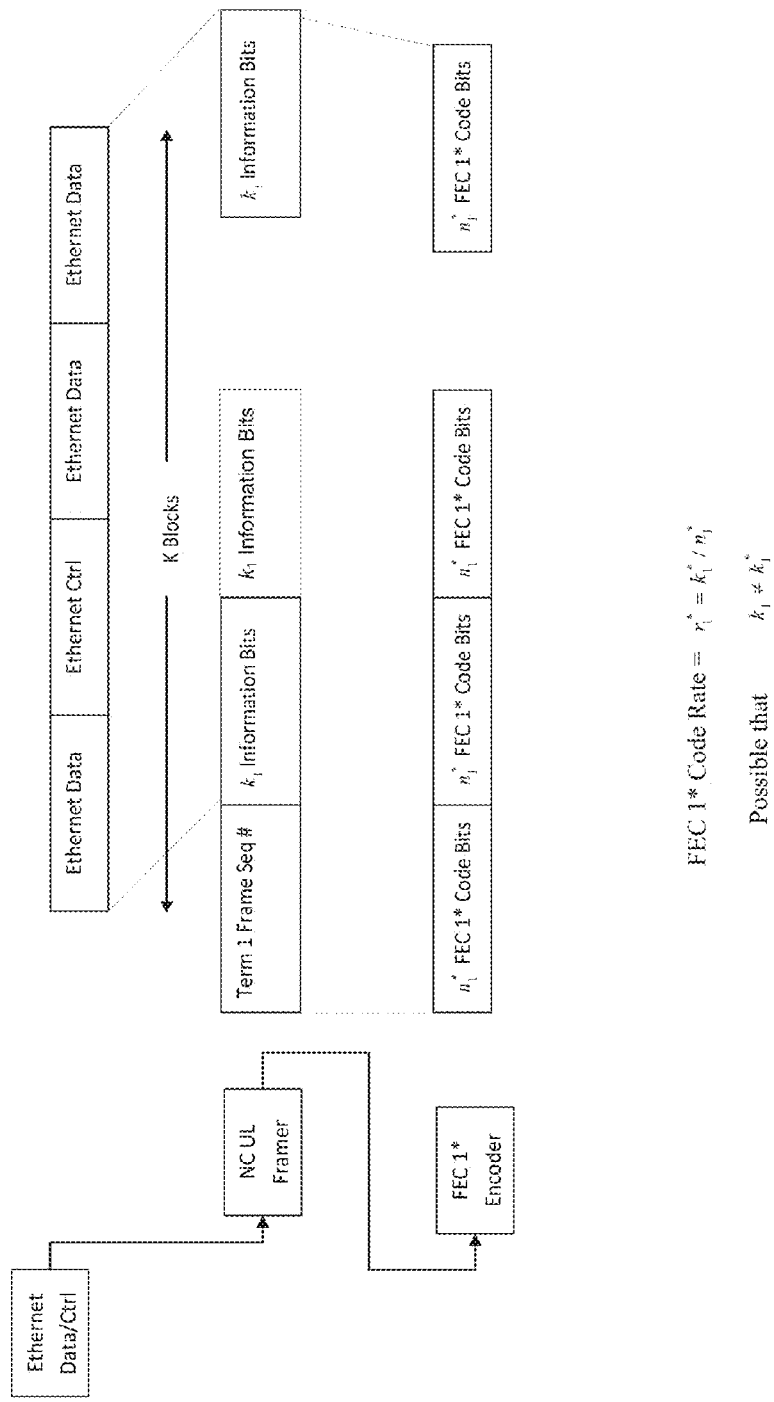
FIG. 16 illustrates UL FEC encoding at terminal $T_1$, according to an embodiment of the present invention.

In FIG. 16, at terminal $T_1$, a network coding UL framer generates a frame sequence number and inserts the frame sequence number in the UL information, such that the UL information stream includes the data packets, the control packets, the terminal identifier for terminal $T_1$, and the frame sequence number. Similarly, in FIG. 17, at terminal $T_2$, a network coding framer generates a frame sequence number and inserts the frame sequence number in the UL information, such that the UL information stream includes the data packets, the control packets, the terminal identifier for terminal $T_2$, and the frame sequence number. As will be discussed below, the frame sequence number will be used later to recover the intended message at the destination terminal.

Figure 17:
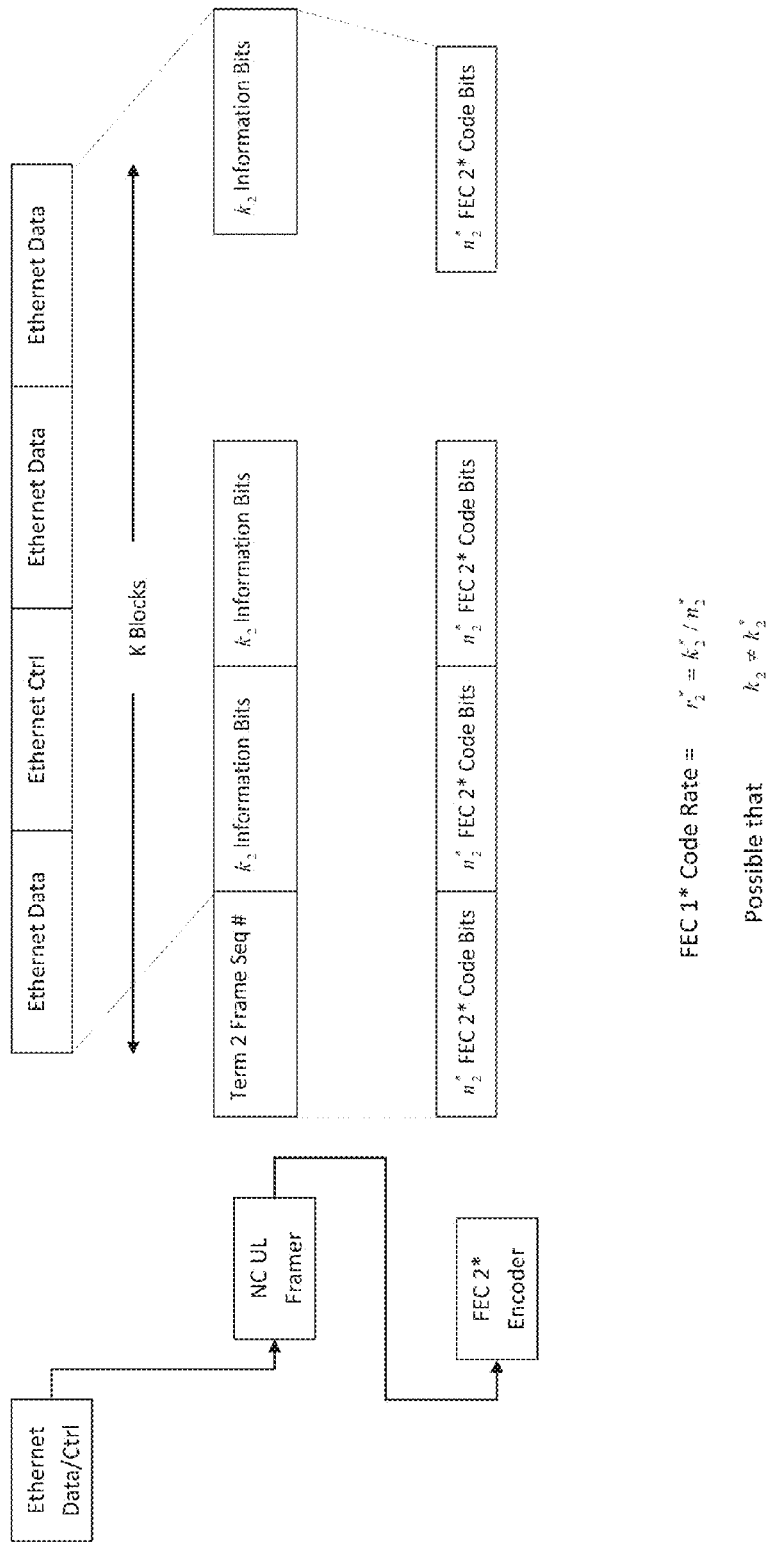
FIG. 17 illustrates UL FEC encoding at terminal $T_2$, according to an embodiment of the present invention.

At terminal $T_1$, FEC 1* encoder 802 may FEC 1* encode the frame sequence number, the terminal identifier, the data packets, and the control packets to generate FEC 1* coded bits. See, for example, FIG. 16, which shows the UL information stream containing the FEC 1* coded bits of the frame sequence number, the terminal identifier, the data packets, and the control packets. Similarly, as shown in FIG. 17, FEC 2* Encoder 812 may perform a similar function to generate FEC 2* coded bits.

It should be appreciated that UL FEC codes are FEC 1* and FEC 2* from Terminals $T_1$ and $T_2$, respectively, with respective code rates $r_1^* = k_1^*/n_n^*$ and $r_2^* = k_2^*/n_2^*$. It is possible that $r_1 \neq r_1^* \neq r_2 \neq r_2$. Prior to transmission by transmitter 804 at terminal $T_1$, for example, the FEC 1* coded bits are UL modulated. A similar process is performed by transmitter 814 at terminal $T_2$.

Once receivers 822A, 822B receive the modulated FEC 1* coded bits from terminals $T_1$ and FEC 2* coded bits from terminal $T_2$, the FEC 1* coded bits and FEC 2* coded bits are demodulated. FEC 1* Decoder 824A may then decode the FEC 1* coded bits and, similarly, FEC 2* Decoder 824B may also decode the FEC 2* coded bits. The control packet may then be removed from the decoded information stream and also be replaced with HDLC fill characters. This is shown in, for example, FIGS. 18 and 19.

Figure 18:
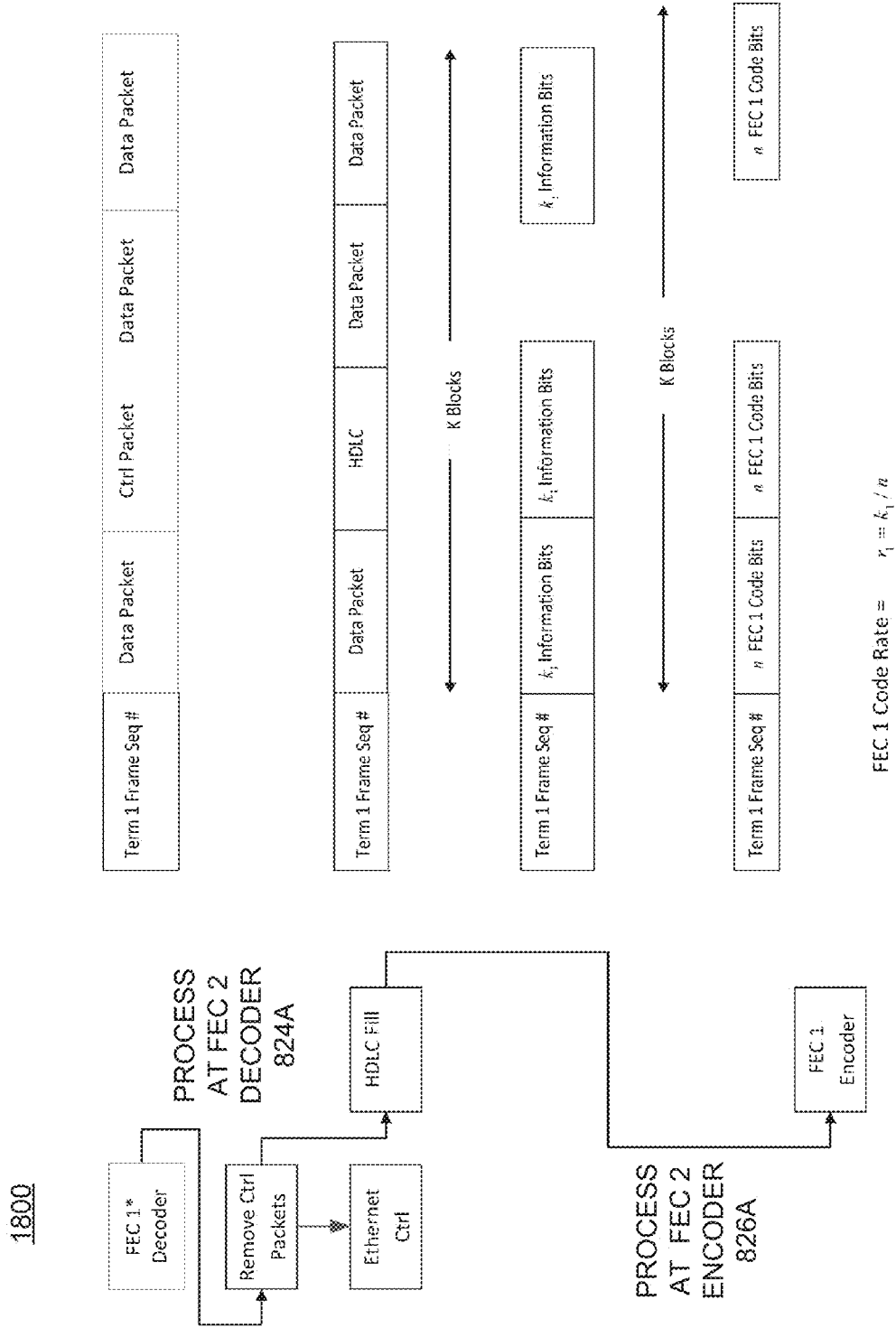
FIG. 18 illustrates control packet removal and DL FEC 1 encoding of received UL transmission from terminal $T_1$, according to an embodiment of the present invention.
Figure 19:
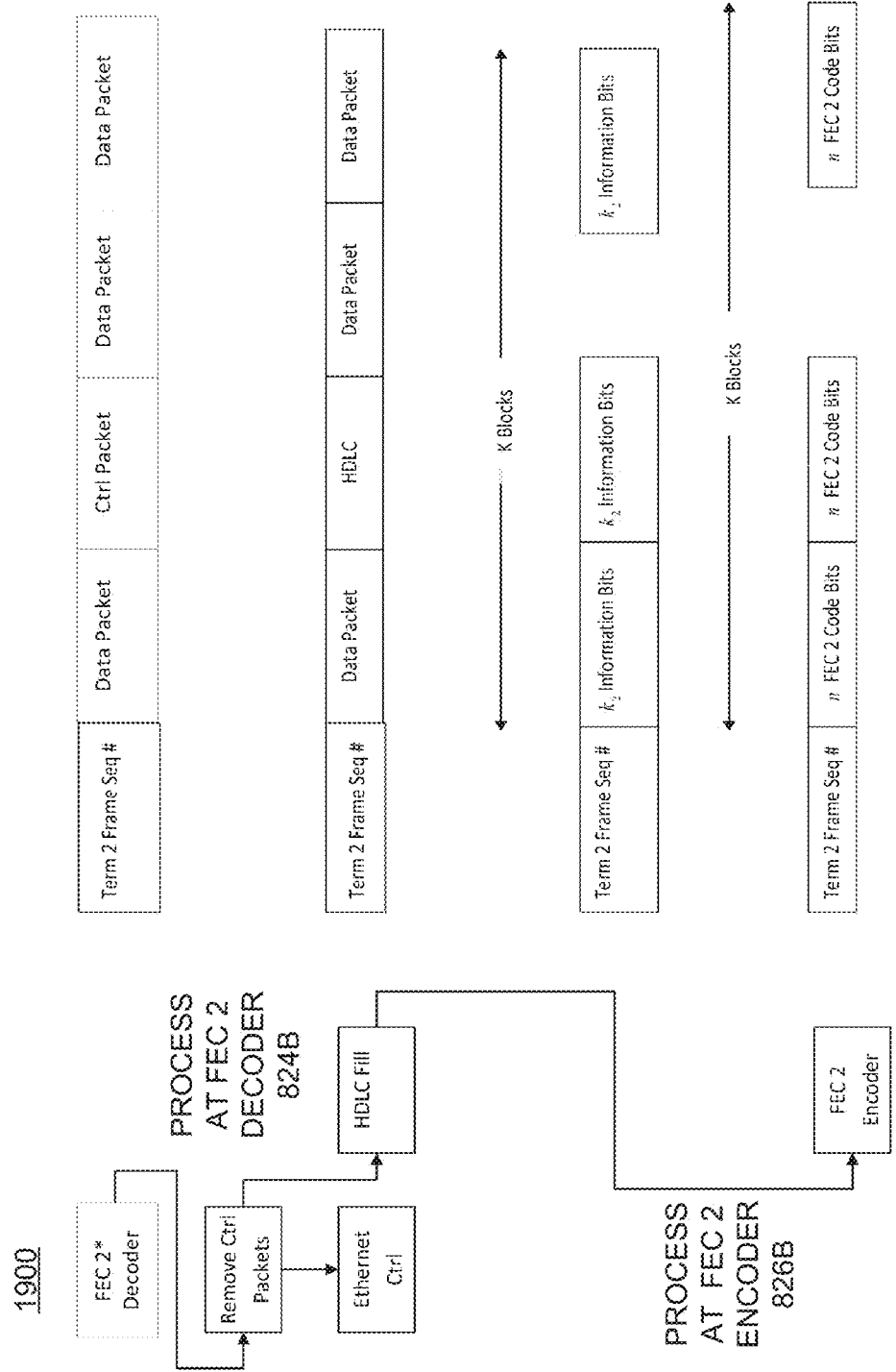
FIG. 19 illustrates control packet removal and DL FEC 2 encoding of received UL transmission from terminal $T_2$, according to an embodiment of the present invention.
Figure 20:
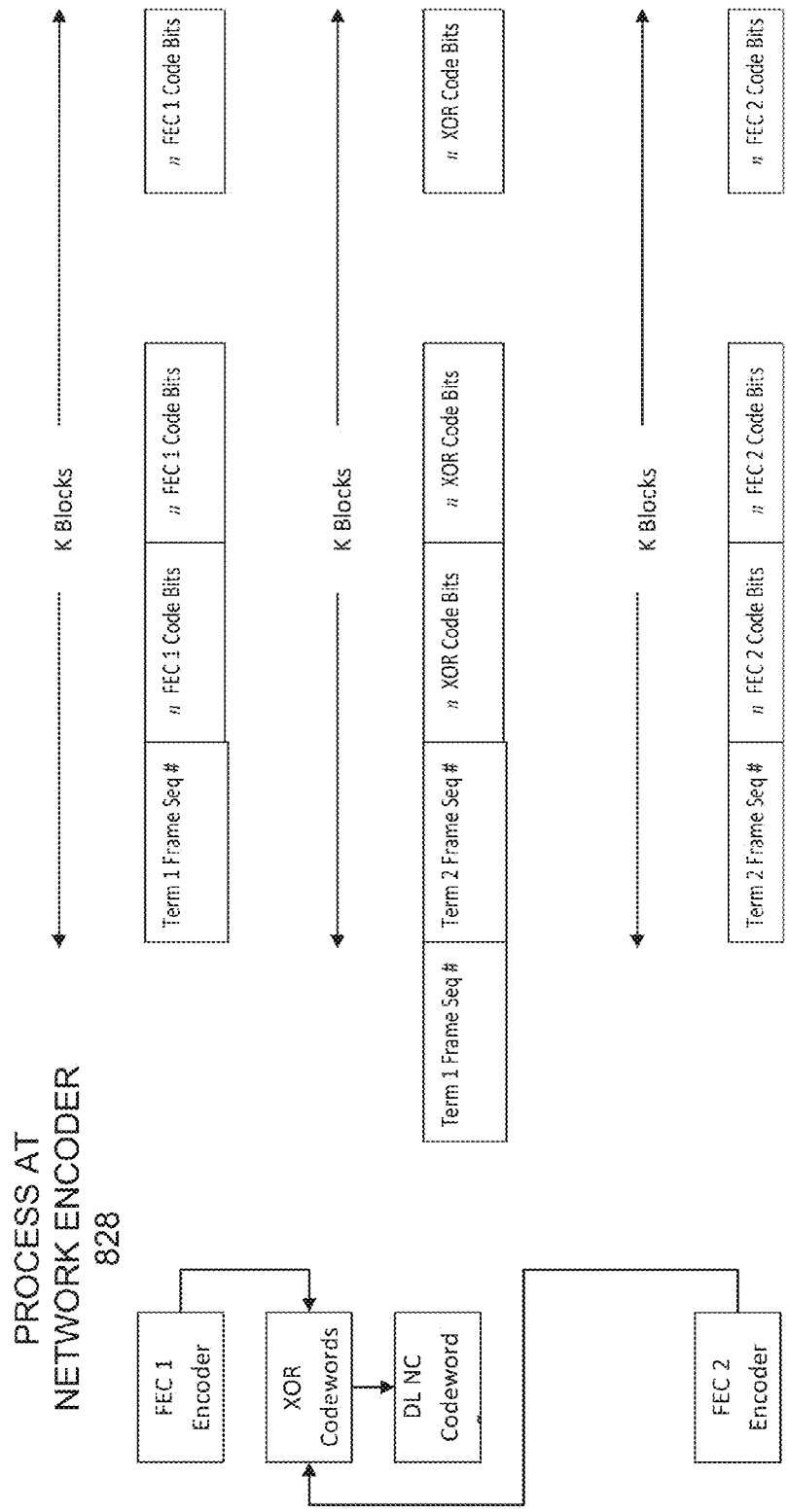
FIG. 20 illustrates controller encoding processing for DL XOR network coding, according to an embodiment of the present invention.

FEC 1 Encoder 826A may then FEC 1 encode data packets and HDLC fill characters in the information stream intended for terminal $T_2$ to generate DL FEC 1 coded bits and, separately, FEC 2 Encoder 826B may FEC 2 encode the data packets and HDLC fill characters in the information stream intended for terminal $T_1$ to generate DL FEC 2 coded bits. This process is shown in FIGS. 18 and 19, respectively. However, it should be noted that the terminal identifiers and terminal frame sequence numbers that were assigned by the respective terminals $T_1$, $T_2$ are not FEC 1 or FEC 2 encoded.

Network encoder 828 may then XOR network code the DL FEC 1 coded bits and DL FEC 2 coded bits to result in a DL information stream that includes XOR coded bits. The XOR coded bits may now include the information streams from terminal $T_1$ and terminal $T_2$, as well as the HDLC fill characters. Further, the XOR network coded information with K n-bit codewords may include the source terminal identifiers and corresponding UL information stream frame sequence numbers in its header. See, for example, FIG. 20.

Figure 21:
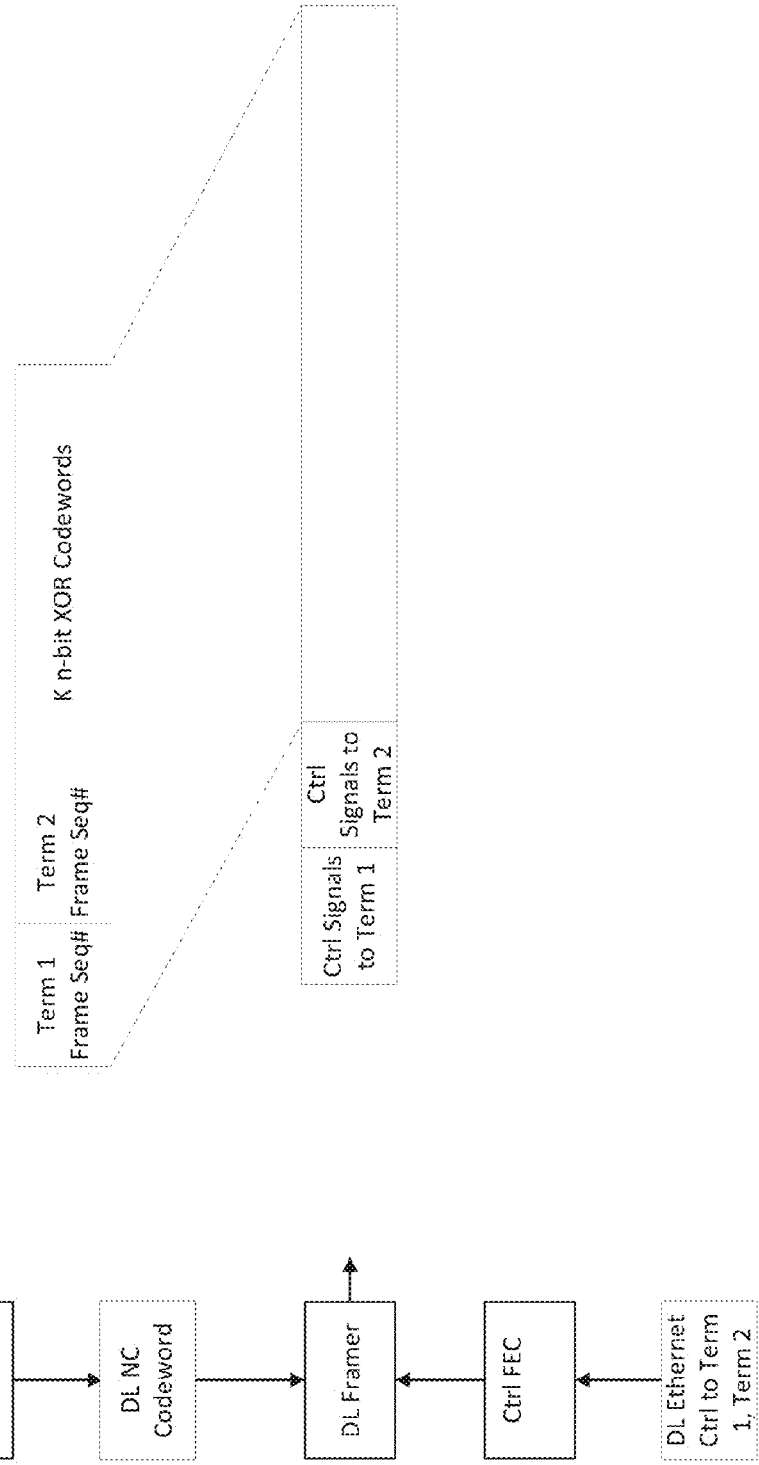
FIG. 21 illustrates a controller DL framer, according to an embodiment of the present invention.

Because the DL control packets for terminal $T_1$ and the DL control packets for terminal $T_2$ cannot be network coded, DL control packets for terminal $T_1$, $T_2$ are encoded using a different FEC encoder, and inserted into a predetermined slot of a DL frame that also contains XOR coded bits. This is shown in FIG. 21.

Figure 22:
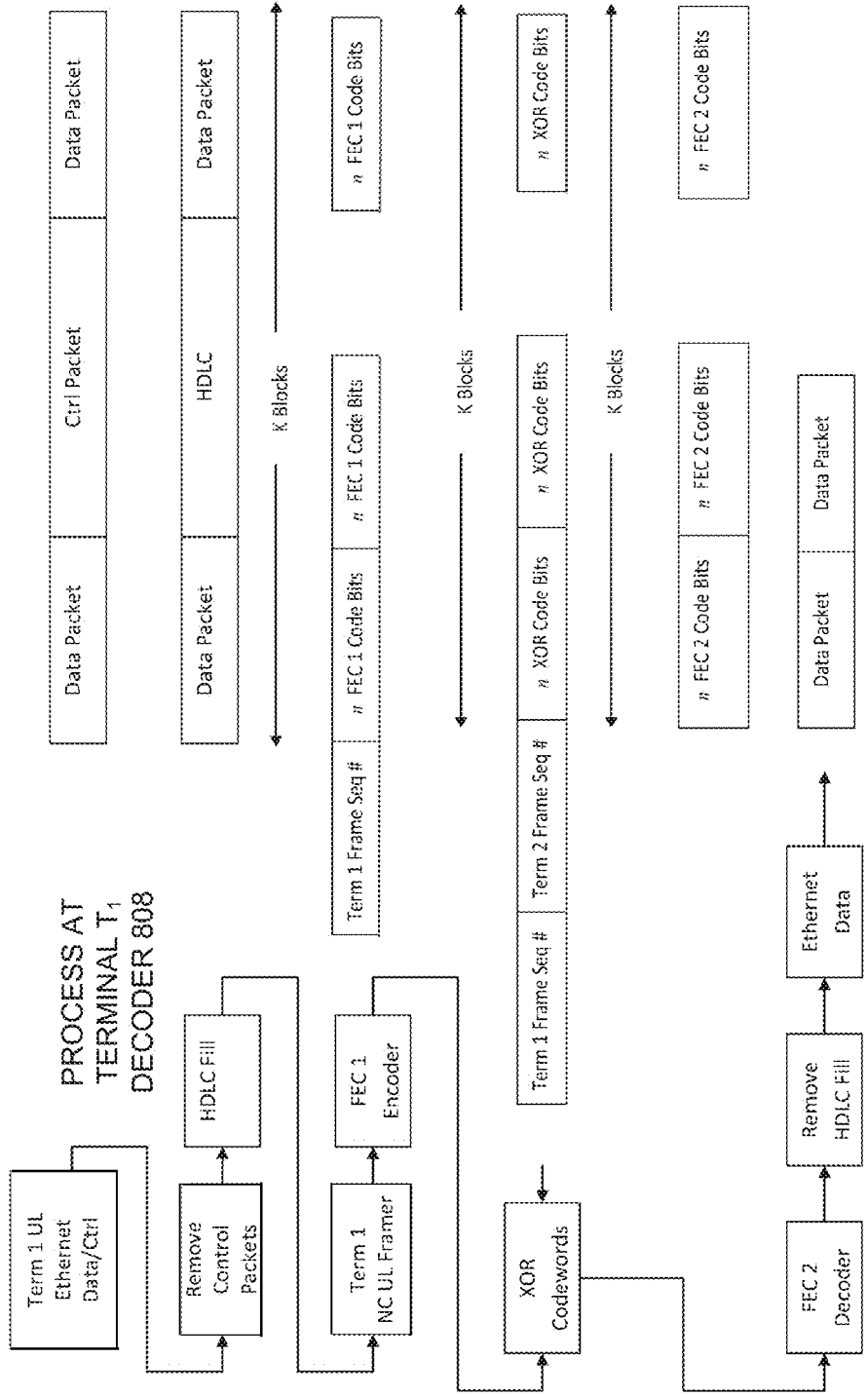
FIG. 22 illustrates processing of received DL transmission from controller at terminal $T_1$, according to an embodiment of the present invention.
Figure 23:
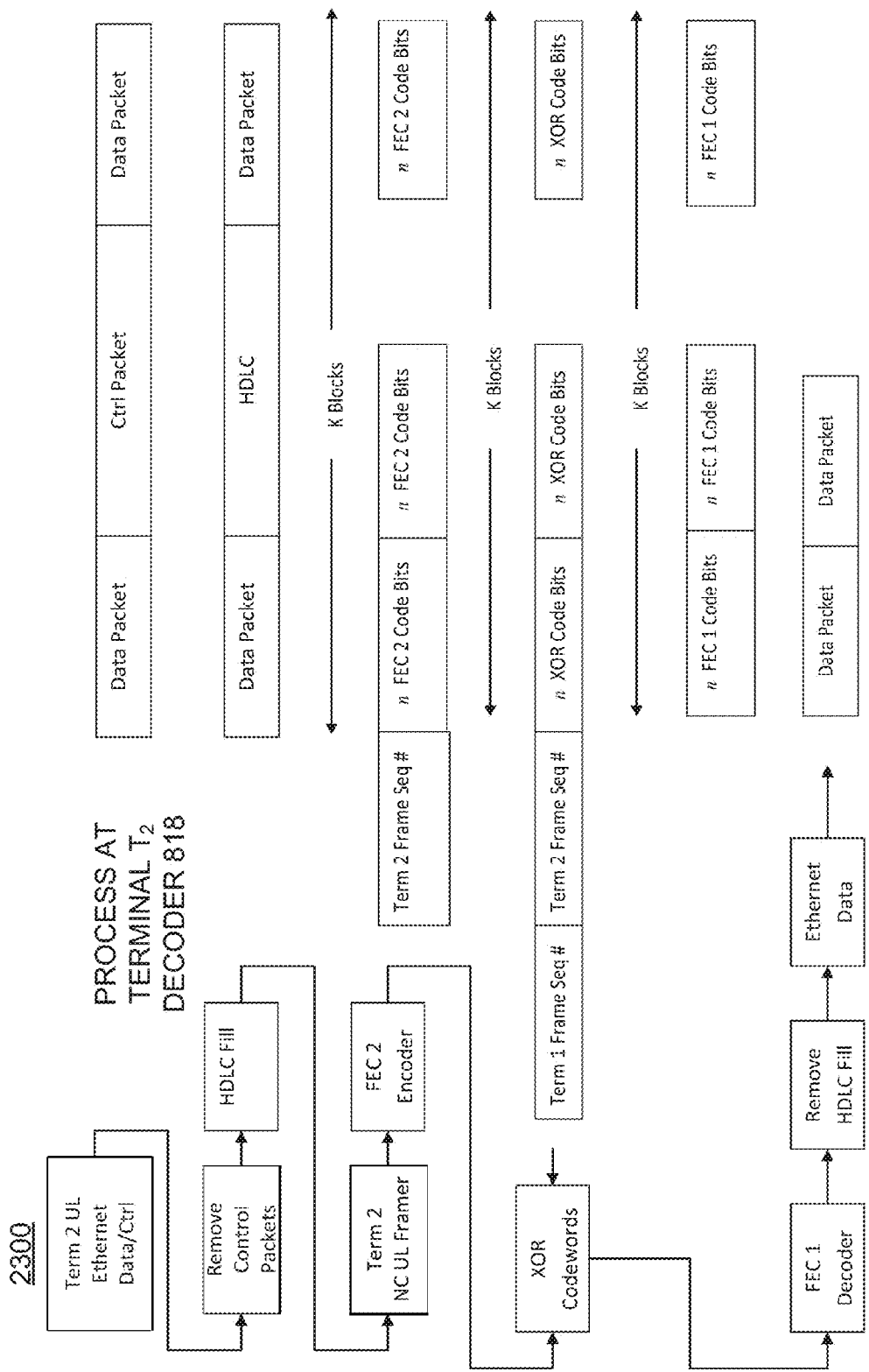
FIG. 23 illustrates processing of received DL transmission from controller at terminal $T_2$, according to an embodiment of the present invention.

Finally, the processing required in terminals $T_1$, $T_2$ for recovering the individual code sequences from the received XOR physical network coded sequence are shown in FIGS. 22 and 23. As noted above, prior to transmission from terminal $T_1$, for example, the UL information stream included data packets and control packets. This UL information stream may also contain terminal $T_1$ frame sequence numbers inserted by the UL framer. These control packets are replaced with HDLC fill characters at network coding controller NCC prior to DL transmission to terminal $T_1$, $T_2$. See, for example, FIGS. 18 and 19. Next, the same frame sequence numbers assigned by terminal $T_1$ in its uplink transmission are assigned to the information stream and the DL FEC 1 encoder 826A at network coding controller NCC encodes the data packets and the HDLC fill characters in the UL information stream to generate DL FEC 1 coded bits. This process may be repeated at terminal $T_1$ to generate the same DL FEC 1 coded bits of terminal $T_1$ data and HDLC fill characters of its UL control packets. This may be performed by FEC 1* encoder 802 or by FEC 2 decoder 808, as shown in FIG. 8. The assigned terminal $T_1$ frame sequence number identifies these DL FEC 1 coded bits. The DL FEC 1 coded bits generated at terminal $T_1$ are then XORed with corresponding broadcasted DL XOR coded bits that were received from controller NCC, to recover the FEC 2 coded bits. It should be noted that the frame sequence number identifying these DL FEC 1 coded bits should match the terminal $T_1$ frame sequence number that identifies the received DL XOR coded bits for this process.

FEC 2 decoder 808, in terminal $T_1$, may decode the recovered FEC 2 coded bits, and remove the HDLC fill, to recover the data packets that were transmitted from terminal $T_2$. A similar process is shown in FIG. 23 for terminal $T_2$.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

It is understood that all the components of this invention as described is not limited to only satellite communications. All the components of this invention may be designed in various other configurations for wireless applications such as cellular, Wi-Fi and other wireless networks that employ a base station serving wireless client terminals. In these applications, a network coding controller in the wireless base station can perform the same functions as the network coding controller in the satellite.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a first receiver configured to receive an uplink message from a first terminal;
   a second receiver configured to receive an uplink message from a second terminal;
   a controller configured to XOR network code the uplink message from the first terminal and the uplink message from the second terminal to generate a XOR network coded message, wherein the XOR network coded message comprises a frame sequence number of the first terminal, a frame sequence number of the second terminal, the uplink message from the first terminal, and the uplink message from the second terminal; and
   a transmitter configured to broadcast the XOR network coded message to the first terminal and the second terminal, wherein
   the uplink message from the first terminal comprises the frame sequence number of the first terminal, forward error correction coded data packets intended for the second terminal, and a forward error correction coded control packet for the controller, and
   the uplink message from the second terminal comprises the frame sequence number of the second terminal, forward error correction coded data packets intended for the first terminal, and a forward error correction coded control packet for the controller.

2. The apparatus of claim 1, wherein the controller is further configured to
   forward error correction decode the coded data packets and the coded control packet of the uplink message from the first terminal, and
   forward error correction decode the coded data packets and the coded control packet of the uplink message from the second terminal.

3. The apparatus of claim 2, wherein the controller is further configured to
   replace the decoded control packet in the uplink message of the first terminal with high level data link control fill, and
   replace the decoded control packet in the uplink message of the second terminal with high level data link control fill.

4. The apparatus of claim 3, wherein the controller is further configured to
   forward error correction encode the decoded data packets and the high level data link control fill in the uplink message of the first terminal to generate a coded message of the first terminal, and
   forward error correction encode the decoded data packets and the high level data link control fill in the uplink message of the second terminal to generate a coded message of the second terminal.

5. The apparatus of claim 1, wherein the controller is further configured to
   insert a frame sequence number assigned by the first terminal in the XOR network coded message, and
   insert a frame sequence number assigned by the second terminal in the XOR network coded message.

6. The apparatus of claim 1, wherein the controller is further configured to encode a control signal for the first terminal and a control signal for the second terminal.

7. The apparatus of claim 6, wherein the controller is further configured to insert the coded control signal for the first terminal and the coded control signal for the second terminal in the XOR network coded message.

8. An apparatus, comprising:
   a controller is configured to XOR network code a message from a first terminal and a message from a second terminal to generate a XORed network coded message broadcasted to the first terminal and the second terminal, wherein
   the XORed network coded message comprises a frame sequence number of the first terminal and a frame sequence number of the second terminal, and
   the controller comprises
      a forward error correction one decoder configured to forward error correction one decode the message from the first terminal and replace a control packet in the forward error correction one decoded message with high level data link control fill, and
      a forward error correction two decoder configured to forward error correction two decode the message from the second terminal and replace a control packet in the forward error correction two decoded message with high level data link control fill.

9. The apparatus of claim 8, wherein the controller comprises:
   a first receiver configured to receive the message intended for the second terminal from the first terminal; and
   a second receiver configured to receive the message intended for the first terminal from the second terminal.

10. The apparatus of claim 8, wherein the controller further comprises:
    a forward error correction one encoder configured to forward error correction one encode the forward error correction one decoded message to generate a forward error correction one coded message; and
    a forward error correction two encoder configured to forward error correction two encode the forward error correction two decoded message to generate a forward error correction two coded message.

11. The apparatus of claim 10, wherein the controller further comprises:
    a network encoder configured to XOR network code the forward error correction one coded message with the forward error correction two coded message to generate the XORed network coded message.

12. The apparatus of claim 11, wherein the network encoder is further configured to insert the frame sequence number assigned by the first terminal and the frame sequence number assigned by the second terminal in the XORed network coded message.

13. The apparatus of claim 8, wherein the controller further comprises:
    a control forward error correction encoder configured to forward error correction encode a control message intended for the first terminal and a control message intended for the second terminal.

14. The apparatus of claim 13, wherein the controller is configured to insert the forward error correction coded control message intended for the first terminal and the forward error correction coded control message intended for the second terminal into the XORed network coded message.

15. A system, comprising:
    a network coding controller configured to
       perform a XOR network coding operation on the information received from a first terminal and second terminal, and
       broadcast a single downlink message comprising the XORed network coded information to the first and second terminal, wherein the XORed network coded information comprises a control message intended for the first terminal, and control message intended for the second terminal, a first terminal frame sequence number, a second terminal frame sequence number, the information intended for the first terminal, and the information intended for the second terminal, the information received from the first terminal comprises the frame sequence number of the first terminal, forward error correction coded data packets intended for the second terminal, and a forward error correction coded control packet for the network coding controller, and the information received from the second terminal comprises the frame sequence number of the second terminal, forward error correction coded data packets intended for the first terminal, and a forward error correction coded control packet for the network coding controller.

16. The system of claim 15, wherein the first terminal is configured to receive the XORed network coded information.

17. The system of claim 16, wherein the first terminal is further configured to XOR network decode the XORed network coded data with the information transmitted from the first terminal to the network coded controller to recover intended information from the second terminal.

18. The system of claim 15, wherein the second terminal is configured to receive the XORed network coded information.

19. The system of claim 18, wherein the second terminal is further configured to XOR network decode the XORed network coded data with the information transmitted from the second terminal to the network coded controller to recover intended information from the first terminal.

* * * * *